(12) United States Patent
Herman et al.

(10) Patent No.: US 9,904,018 B2
(45) Date of Patent: Feb. 27, 2018

(54) MULTIPULSE SYSTEM FOR WRITING WAVEGUIDES, GRATINGS, AND INTEGRATED OPTICAL CIRCUITS

(76) Inventors: Peter R. Herman, Mississauga (CA); Haibin Zhang, Toronto (CA); Shane Michael Eaton, Toronto (CA)

(*) Notice: Subject to any disclaimer, the term of this patent is extended or adjusted under 35 U.S.C. 154(b) by 40 days.

(21) Appl. No.: 12/531,566

(22) PCT Filed: Mar. 14, 2008

(86) PCT No.: PCT/CA2008/000507
§ 371 (c)(1),
(2), (4) Date: Sep. 26, 2011

(87) PCT Pub. No.: WO2008/113165
PCT Pub. Date: Sep. 25, 2008

(65) Prior Publication Data
US 2012/0039567 A1    Feb. 16, 2012

Related U.S. Application Data

(60) Provisional application No. 60/895,168, filed on Mar. 16, 2007, provisional application No. 60/969,572, filed on Aug. 31, 2007.

(51) Int. Cl.
*G02B 6/34* (2006.01)
*G02B 6/13* (2006.01)
(Continued)

(52) U.S. Cl.
CPC ............ *G02B 6/34* (2013.01); *G02B 6/124* (2013.01); *G02B 6/13* (2013.01); *G02B 5/1857* (2013.01);
(Continued)

(58) Field of Classification Search
CPC ...................... G02B 6/13; G02B 2006/171
(Continued)

(56) References Cited

U.S. PATENT DOCUMENTS 7,568,365 B2 * 8/2009 Schaffer et al. ............... 65/377
8,270,788 B2 * 9/2012 Herman et al. .............. 385/37
(Continued)

*Primary Examiner* — Omar R Rojas
(74) *Attorney, Agent, or Firm* — Eugene J A Gierczak; Miller Thomson LLP

(57) ABSTRACT

The present invention provides a direct laser writing fabrication method and system for devices having periodic refractive index modulation structures, for example, Bragg gratings. By focusing a modulated pulsed laser beam into a transparent material substrate, a path of laser modified volumes can be formed with modified refractive index compared with the unprocessed material. Modulation of exposure conditions provides periodic or modified periodic waveguide structures such that the waveguide structures exhibit grating responses and can be used for a variety of optical applications, for example, as spectral filters, Bragg reflectors, grating couplers, grating sensors, or other devices. The method enables direct one-step fabrication and integration of periodic or modified periodic refractive-index modulation devices together with other optical waveguiding devices to enable low-cost, multifunctional one-dimensional, two-dimensional or three-dimensional optical circuit fabrication of simple and complex optical systems.

18 Claims, 38 Drawing Sheets

(51) Int. Cl.
*G02B 6/124* (2006.01)
*G02B 6/12* (2006.01)
G02B 5/18 (2006.01)
G02B 6/02 (2006.01)

(52) U.S. Cl.
CPC .............. *G02B 6/02147* (2013.01); *G02B 2006/12164* (2013.01); *G02B 2006/12171* (2013.01)

(58) Field of Classification Search
USPC .......... 385/14, 37, 129, 130, 131, 132, 141; 264/1.37, 400; 438/31, 32; 427/163.1, 427/162
See application file for complete search history.

(56) References Cited

U.S. PATENT DOCUMENTS

| | | | |
|---|---|---|---|
| 2002/0162360 A1* | 11/2002 | Schaffer et al. | 65/392 |
| 2003/0223043 A1* | 12/2003 | Yoshino | 353/10 |
| 2006/0127024 A1* | 6/2006 | Smith et al. | 385/132 |
| 2006/0219676 A1* | 10/2006 | Taylor et al. | 219/121.69 |
| 2009/0304331 A1* | 12/2009 | Herman et al. | 385/37 |
| 2012/0039567 A1* | 2/2012 | Herman et al. | 385/37 |

* cited by examiner

MULTIPULSE SYSTEM FOR WRITING WAVEGUIDES, GRATINGS, AND INTEGRATED OPTICAL CIRCUITS

PRIORITY

The present application claims priority from U.S. provisional patent applications No. 60/895,168 filed Mar. 16, 2007 and U.S. 60/969,572 filed Aug. 31, 2007.

FIELD OF THE INVENTION

The present invention relates to optics and photonics. In particular, the present invention relates to methods and systems for fabricating waveguides, gratings and integrated optical circuits.

BACKGROUND OF THE INVENTION

In optics, gratings with a spatially varying periodic refractive index provide general means of spectral control of light propagation in optical materials. Such refractive index modulation in optical fibers may provide a fiber Bragg grating ("FBG"), widely employed in sensing and Telecom applications as a narrow-band spectral filter. Another manifestation of the fiber-based gratings is the long period grating ("LPG") which has a much larger period of index modulation compared with FBGs. These grating devices are prominent in current sensing and communication applications as fundamental filter or sensor components.

Several methods have been applied to fabricate Bragg and long-period gratings in optical fibers or planner waveguide circuits, but there has been only limited demonstration of such structures in three-dimensional ("3-D") optical circuits.

For gratings in optical fibers, Hill et al. disclosed a FBG structure in U.S. Pat. No. 4,474,427 (1984), which exhibits a Bragg reflection peak only at the wavelength of the writing laser. U.S. Pat. No. 4,807,950 (1989) to Glenn et al. discloses a practical method of FBG fabrication by two-beam laser interference (holography) through the side of the fiber with an ultraviolet laser source. U.S. Pat. No. 5,104,209 (1992) to Hill et al. describes fiber grating fabrication by a point-by-point technique, where an ultraviolet laser beam is pre-shaped by narrow slit masks and flashed through the fiber cladding into the fiber core while the fiber is precisely moved between each laser exposure with respect to the mask. All of these methods require a pre-existing waveguide in which the external ultraviolet laser can interact with sufficient photosensitivity response and modify the refractive index change.

A further improvement to the point-by-point method is disclosed by Snitzer et al. in Canadian Patent No. 2,372,939 (1994) where an amplitude mask comprising a series of square apertures induces the laser light to interfere inside a nearby fiber. Hill et al. in U.S. Pat. No. 5,367,588 (1994) teach FBG fabrication by phase mask interference, which improves the optical exposure stability over the holographic interference technique. Both amplitude and phase mask techniques provide only one Bragg wavelength, and are therefore an inflexible fabrication method where multi-wavelength spectral responses are required. These mask techniques also require ultraviolet light excitation of a pre-existing waveguide (a photosensitive core).

Further, Albert et al. in U.S. Pat. No. 6,256,435 (2001) teach a method of forming Bragg gratings in a planar lightwave circuit ("PLC") with UV laser light and a phase-mask. This method also requires an existing waveguide, such as a Germanium-doped planar waveguide.

Ultrashort laser pulses with femtosecond to picosecond durations have been used to fabricate a broad range of optical devices including buried optical waveguides and gratings. For example, Mourou et al. in U.S. Pat. No. 5,656,186 (1997) describe ultrashort laser interactions with materials, but no devices such as waveguide or grating were described. Mihailov et al. in U.S. Pat. No. 6,993,221 (2006) teach the combination of ultrafast laser and phase mask for FBG fabrication. Kalachev et al. in Journal of Lightwave Technology 23, 8, 2568-2578 (2005) disclose a femtosecond ultraviolet light source (250 fs, 211 nm) method for fabricating a long period fiber grating with point-by-point exposure. As well, Martinez et al., in "Direct writing of fiber Bragg gratings by femtosecond laser", Electron. Lett. 40, 19 (2004), describe point-by-point writing of FBGs with a femtosecond laser (150-fs duration, 1-kHz repetition rate). However, these techniques have only been demonstrated to be successful in a pre-existing waveguide (optical fiber) with no evidence of applicability in PLC or 3-D photonic circuits.

Ultrashort laser systems as well as other sources have also been applied for direct writing of two-dimensional ("2-D") or 3-D photonic devices in various materials. For example, Davis et al. in "Writing waveguides in glass with a femtosecond laser," Opt. Lett. 21, 1729-1731 (1996) disclose a method of forming buried optical waveguides with ultrashort duration lasers. Definitive guiding of light in such structures was subsequently demonstrated by the same research group (K. Miura, Jianrong Qiu, H. Inouye, T. Mitsuyu, K. Hirao, Photowritten optical waveguides in various glasses with ultrashort pulse laser, Appl. Phys. Lett. 71, 3329-3331 (1997)), and then extended by Borrelli et al. in U.S. Pat. No. 6,977,137 (2005) to writing waveguides and other optical devices into three dimensions.

Short-pulse laser writing of waveguides in crystalline materials was demonstrated by Nolte et al. in "Waveguides produced by ultrashort laser pulses inside glasses and crystals", Proc. of SPIE Vol 4637, 188-196 (2002), and "Femtosecond writing of high quality waveguide inside phosphate glasses and crystalline media using a bifocal approach", Proc. of SPIE, vol. 5340, 164-171 (2004), and also disclosed recently in PCT Patent No. WO 2005/040874 to Khruschev et al. Khruschev et al. further propose a laser method of forming volume diffraction gratings by writing multiple parallel waveguides side by side.

In addition to the use of ultrashort (i.e. <10 ps) lasers to write buried waveguides and related structures in 3-D (e.g., directional couplers, splitters, lasers, etc.), there are also examples of longer pulse duration lasers (<1 microsecond) being successfully applied to 3-D fabrication of volume grating, for example (J. Zhang, P. R. Herman, C. Lauer, K. P. Chen, M. Wei, 157 nm laser-induced modification of fused-silica glasses, in Laser Appl. in Microelectronic and Optoelectronic Manuf. V, SPIE Proc. 4274, Photonics West, 20-26 Jan. 2001, pp. 125-132) or buried optical waveguide (for example, see M. Wei, K. P. Chen, D. Coric, P. R. Herman, J. Li, $F_2$-laser microfabrication of buried structures in transparent glasses, Photon Processing in Microelectronics and Photonics, SPIE Proc. 4637, Photonics West, 20-25 Jan. 2002, p. 251-257) formation in bulk optical materials also without pre-existing waveguides.

The above methods demonstrate laser approaches for fabricating and integrating optical functions in 3-D that extend beyond optical fiber one-dimensional ("1-D") and planar lightwave circuits (2-D). However, despite the work described above, there have only been limited attempts to inscribe grating structures into such laser-written waveguides.

In "Direct laser written waveguide-Bragg gratings in bulk fused silica," Opt. Lett. 31, 2690-2691 (2006), Marshall et al. demonstrate a two-step laser method for writing second order grating structure in fused silica glass. A continuous waveguide is fabricated by scanning a focussed short pulse laser beam in bulk glass, then followed with the same laser in a different focusing condition to form Bragg gratings by point-by-point exposure that overlaps the newly-formed waveguide. Reflection spectra revealed a weak Bragg grating response while transmission spectra were not reported.

Yamaguchi described in Japanese Patent Application No. (2000)-144280 a method to generate an optical waveguide in a doped glass with first-order Bragg gratings responses. The Bragg responses are induced during laser scanning by periodically changing the intensity of the laser light, the diameter of laser light at the focusing point or the relative moving speed. Smooth waveguides with periodic modification of refractive index are described. The method includes delivery of more than 100 laser pulses per waveguide segment (period typically of 0.5 µm) and weak period perturbations in the laser exposure conditions. The average intensity for forming 1300 nm wavelength Bragg resonances was varied from 90-100% during scanning using variable neutral density filters or shutters for attenuation.

In view of the foregoing, an improved means of forming waveguides simultaneously with Bragg gratings is desirable.

SUMMARY OF THE INVENTION

The present invention is directed at fabricating optical devices with waveguides and gratings.

In one aspect, the present invention is a method for point-by-point fabrication of gratings or other periodic optical structures and waveguides in a transparent substrate by a modulated laser means. A unique periodic structure is formed by individual laser modified volumes ("voxels") in the substrate that function as both gratings and a waveguiding structure. This structure is referred to herein as a grating waveguide ("GW"). A plurality of pulses form each voxel.

In other aspects of the present invention, modulated laser exposure conditions are used to generate the voxels in the substrate and create the periodic (or modified periodic) structure therein. By controlling the scan speed and modulating laser exposure conditions during the laser writing, isolated or partially-isolated or overlapping laser-modified voxels can be formed in the substrate with arbitrary periodic spacing that (i) define a low loss optical waveguide that can be scanned flexibly in any 3-D path through the substrate, and (ii) simultaneously superimpose a periodic or chirped grating that provides a controlled spectral response for reflection, diffraction, and/or transmission within any section of the waveguide. The grating periods can be varied to form highly complex optical circuits in a relatively brief period of time. The method also provides for apodization and periodic chirping of the grating structures, or more generally the formation of multiple phase-shift elements by various means, including for example, by tuning the modulation of relative scanning speed, laser intensity, exposure duty cycle, and other laser parameters during the point-by-point fabrication.

In yet another aspect, the method of the present invention can also provide smoothly connected and weakly modulated waveguides, for example, by applying only weak modulation of laser exposure conditions during the formation of interaction volumes, defined using an acousto-optic modulator ("AOM"). The use of an AOM improves the accuracy of exposure control and the variety of modulation envelopes that collectively offer facile and reproducible means for improving the quality and functionality of optic devices made in accordance with the method of the present invention.

In another aspect, the present invention is a system for single step GW writing comprising a source, a modulation device and a beam delivery system. In one particular embodiment of the present invention, an AOM is implemented as the modulation device.

In another aspect, the device may comprise a segmented waveguide structure formed by an array of individual refractive index voxels, wherein each voxel is formed by a plurality of pulses.

In another aspect, the present invention provides a method for fabricating an optical device comprising scanning a modulated energy source in a substrate to write a plurality of voxels, the voxels defining a grating and waveguide structure. The voxels may be discrete, and each voxel may be written by a plurality of pulses.

In another aspect, the structure may be periodic or modified periodic. In a further aspect, the energy source may be modulated according to power, beam diameter, scan speed, polarization, transverse scan speed, focusing depth, pulse duration or wavelength. The energy source is pulsed or continuous, and it may comprise a laser, an e-beam source, an ion-source or an X-ray source. The energy source may be modulated using an acousto-optic modulator, or it may be modulated using an acousto-optic modulator means, an attenuator means, an OD filter means or a shutter means.

According to another aspect of the present invention, the substrate may be glass, crystal, semiconductor material or polymer.

According to another aspect, the substrate may be a composite material, such as multilayers, multifibers, or tubes or any geometry of two or more kinds of materials. The GW may be formed at or near the interface inside a first material such that an evanescent field can probe the second material. The second material may be matter of any state including a solid, liquid, gas or plasma that will modify the Bragg wavelength resonance for a sensing or control application. The second material may be a microfluidic channel, microreactor, or other volume to be proved by the evanescent field of the GW. In one embodiment, the present invention may include the formation of a GW near the surface of a substrate such that the evanescent field of the GW probes the ambient liquid, gas, air, solid, composite, or plasma in contact with the surface.

According to yet another aspect, the method of the present invention may be used to fabricate a mode converter, a directional coupler, a distributed Bragg reflector, a chirped Bragg grating, an apodized Bragg grating, an add-drop filter, a sensor, a ring resonator or a laser reflector.

According to a further aspect of the present invention, there is provided a system for fabricating an optical device comprising an energy source; a modulating means for modulating the energy source; and a beam delivery means for applying the energy source to a substrate, whereby the energy source is scanned in the substrate to write a plurality of voxels, the voxels defining a grating and waveguide structure. The modulating means may be an acousto-optic modulator.

The method and system of the present invention enables 3-D fabrication and integration of sensing and filtering functions in 1-D, 2-D, and 3-D optical circuits. Because one laser writing step may be employed, the method of the present invention simplifies the fabrication process which leads to faster fabrication, lower cost and enables highly versatile optical devices or systems to be designed and fabricated. Further, the method and system apply weaker multiple pulse interactions to build up refractive index changes more gently over a number of laser pulses that potentially reduce stress, shock, defect formation, and other deleterious effects. Multiple pulses further offer substantial control of voxel-to-voxel overlap, physical size, shape, strength of refractive index change, and other optical parameters, thus enabling new means to control the relative. AC and DC components of the waveguide effective refractive index, and thereby may be used to tune Bragg grating spectral features in shape, strength, polarization dependence, radiation loss, and dispersion. With appropriate matching of laser exposure conditions to the optical properties of transparent or near-transparent substrates, the method of the present invention lends application to a broad range of materials, including but not limited to glasses, crystals, polymers and multi-layered or multi-structured materials.

BRIEF DESCRIPTION OF THE DRAWINGS

A detailed description of the preferred embodiments is provided herein below by way of example only and with reference to the following drawings, in which.

Figure 1:
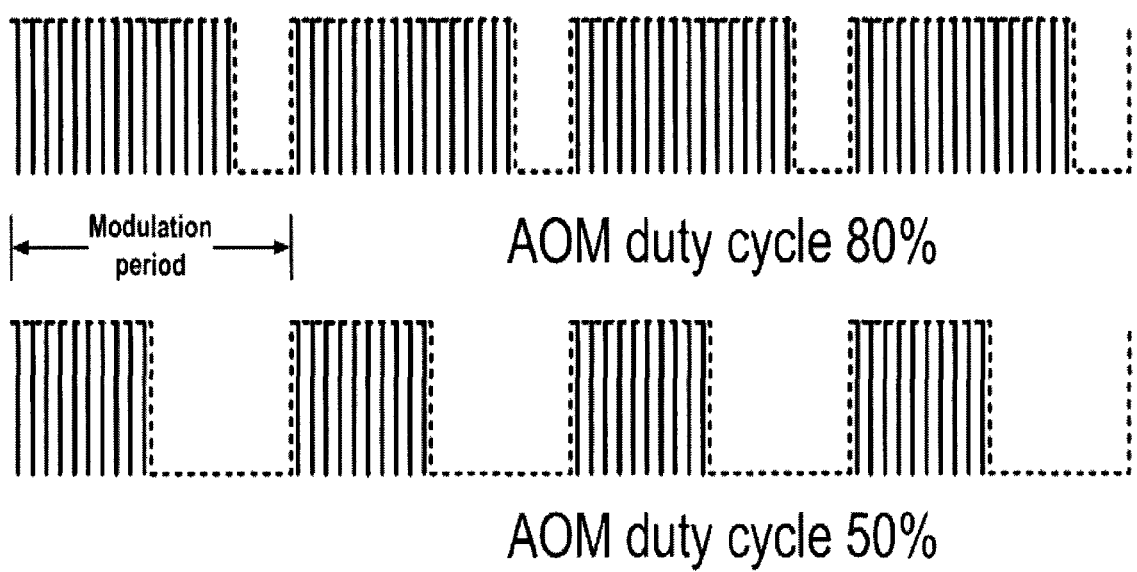
FIG. 1 illustrates one method of AOM modulation for full (0 to 100%) power modulation of the $1^{st}$ order output beam.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

The present invention provides a method and system for fabricating grating waveguide (GW) devices, for example, inside bulk optical materials. The waveguides are defined by a periodic or modified periodic array of voxels, each formed by modulated focused laser light that modifies the refractive index and/or absorption properties of the medium.

The term "voxel" as used herein should be understood to mean an interaction volume in a substrate where an energy source has modified the substrate in 3-D.

The term "modified periodic" refers to a structure slightly modified from a perfect periodic grating structure that exhibits similar grating responses with modified characteristics. For example, a "chirped grating" is a structure with gradually varied period around a center period Λ along the grating length which has a broadened Bragg grating filtering function, whereas an "apodized grating" is a structure with gradually varied refractive index contrast along the grating length which has better side lobe suppression for the reflection spectrum and other spectral shaping benefits.

According to one aspect, the present invention is a method for fabricating an optical device comprising scanning a modulated energy source inside a substrate to form a plurality of voxels, the voxels defining a grating and waveguide structure. The method depends on the exposure of a plurality of pulses, and includes pulse shaping of continuous wave light sources, to form an individual refractive index voxel in the bulk optical material. By scanning a laser beam through the sample (or other relative scanning method such as scanning sample with a fixed laser beam position), the voxel arrays, forming a predetermined pattern, serve as both an optical waveguide and a grating with spectral filtering capability.

According to another aspect, the present invention is a system for fabricating an optical device, the system comprising an energy source, a modulating means for modulating the energy source, and a beam delivery means for applying the output from the energy source to a substrate, whereby the energy beam is scanned in the substrate to modify the material and form a plurality of voxels, the voxels defining a grating and waveguide structure.

It should be understood that the method and system of the present invention produce optical devices having a unique grating waveguide structure where individual voxels having altered refractive index are connected in varying degrees, from isolated/discrete voxels to overlapping/interconnected volumes. In either case, optical waveguides with spectral filtering functions are formed.

According to another aspect, the present invention provides a method of modulating laser exposure conditions during writing of buried optical waveguides. This includes laser power or intensity modulation, as described in the examples below.

The present invention also describes novel modulation methods of the laser beam for making such voxels, including but not limited to the use of acousto-optic beam modulators.

In U.S. Provisional Patent Application No. 60/801,386, a related application, a method of applying a single laser pulse to drive the full refractive index modulation and form a single waveguide segment (or "voxel") is disclosed. The grating waveguide is defined in transparent material by an array of individual voxels, where each voxel is shaped by the focal volume of the laser beam and formed with only a single laser pulse. The voxel presents a small-volume modification of the refractive index in the bulk material, while the voxel array defines a new type of segmented waveguide that can be formed in 3-D in bulk transparent materials. The overlap of the isolated voxels defines the period of the index modulation, which is readily tunable by sample scan speed and/or beam modulation rate and/or laser repetition rate. This method produces strong Bragg resonances. Grating strength can be simply controlled by the laser exposure conditions (pulse duration, polarization, wavelength, pulse energy, focusing geometry, etc.).

The present invention involves the application of a plurality of pulses to define each voxel. The use of two or more pulses affords similar benefits as the single-pulse method, but with additional advantages. For example, weaker multiple pulse interactions can be applied, as opposed to single-pulse point-by-point interactions, to build up refractive index changes more gently over a number of laser pulses that potentially reduce stress, shock, defect formation, and other deleterious effects to improve the waveguide performance, for example, by reduced propagation loss or reduced polarization dependence. Multiple pulses further offer substantial control of voxel-to-voxel overlap, physical size, physical shape, strength of refractive index change, and other optical parameters, thus enabling new means to control the relative AC and DC components of the waveguide effective refractive index, and thereby accurately tune Bragg grating spectral features in shape, strength, polarization dependence, radiation loss, and dispersion, for example.

Figure 2:
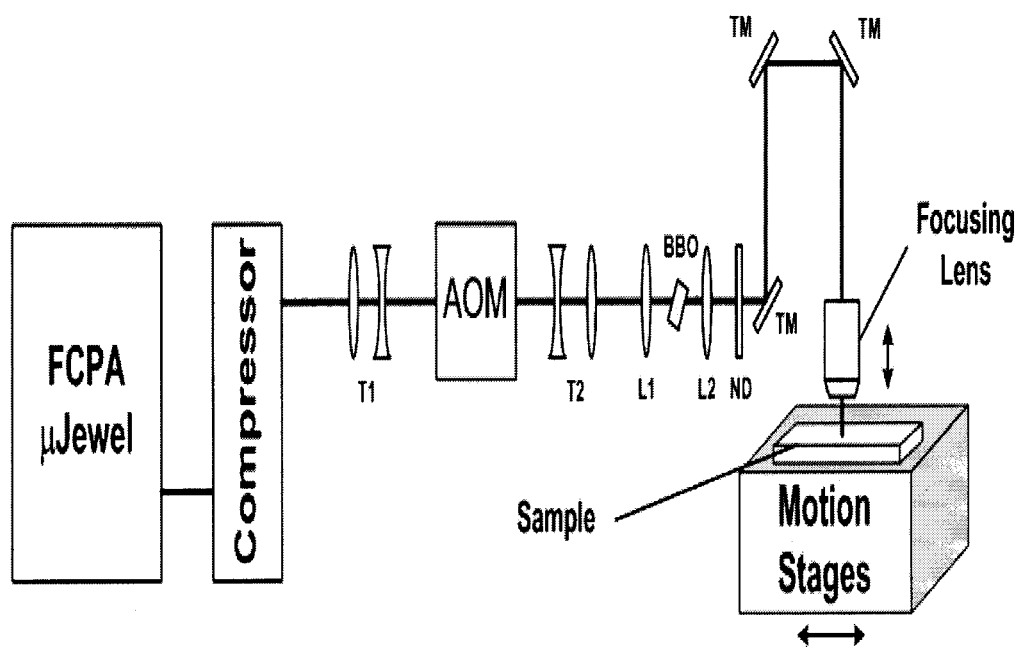
FIG. 2 illustrates a laser beam delivery arrangement in accordance with one embodiment of the invention for forming grating waveguides.
Figure 3:
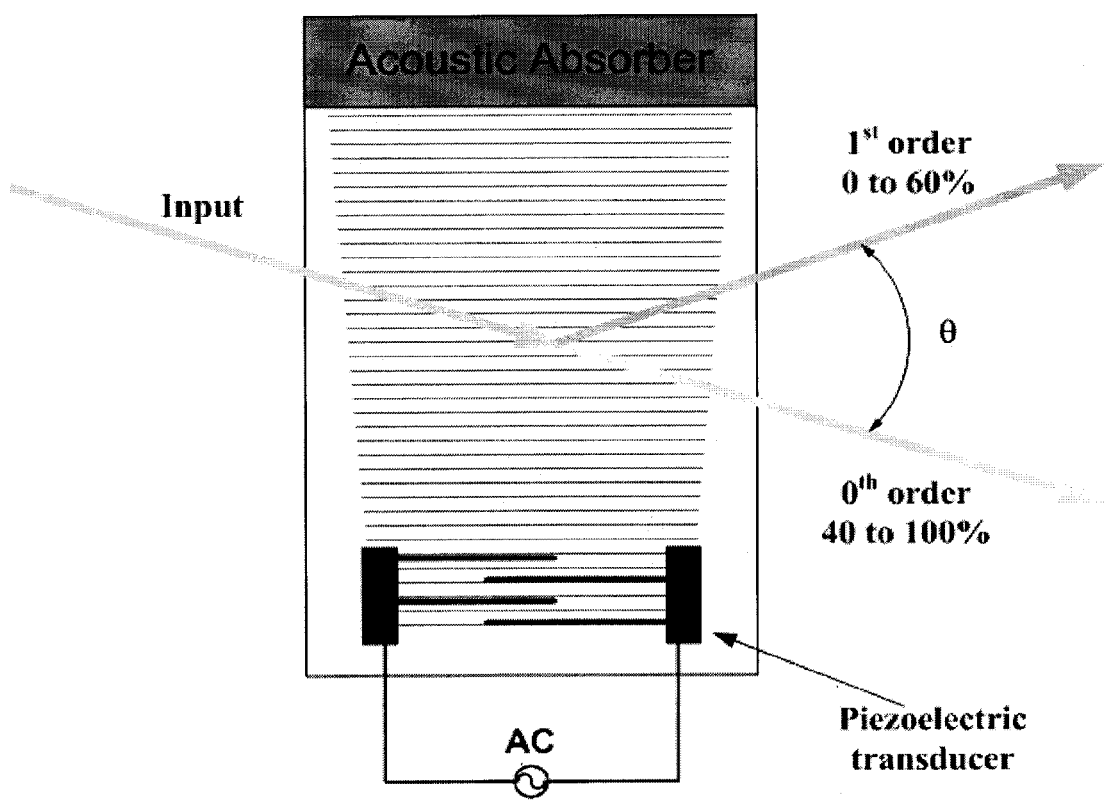
FIG. 3 illustrates an AOM crystal and diffraction of incoming laser beam.

In one embodiment of the present invention, pulses from a laser source, exemplified by the continuous pulse train as shown in FIG. 1 (top), are periodically modulated such that individual laser pulses (vertical lines in figure) are either fully attenuated (0%) or passed (100%) by a modulator device such as the AOM as illustrated in FIG. 2 and FIG. 3. In this way, laser power, intensity and/or pulse energy modulation provides a plurality of laser pulses to form each voxel, for example with a 20% non-irradiation time (80% duty cycle) to fully or partially isolate the voxels from each other according to limits of laser focal spot size, material diffusion, and other variables known to a person of skill in the art. Variation of the AOM duty cycle, for example, the 50% case shown at the bottom of FIG. 1, by techniques well known in the art, can therefore select any number of laser pulses per cycle to provide the plurality of pulses required to form each refractive index voxel.

It should be understood that generally the reflectivity of a grating at the Bragg resonance, R, is an important performance parameter of the grating, and increases monotonically as the refractive index contrast $\Delta n_{AC}$ increases, and typically follows the relationship $$R = \tanh^2\left(\frac{\pi L \eta \Delta n_{AC}}{\lambda}\right),$$

where $\lambda$ is the Bragg wavelength, L is the grating length, and $\eta$ is the modal overlap factor. Hence, high refractive contrast is desired for many applications where effective reflection is needed. The Bragg grating waveguide structure defined by the present invention, where a waveguide is comprised of individual refractive index voxels, has the advantage of providing much higher index contrast compared to a small continuous modulation method, for example.

Figure 4:
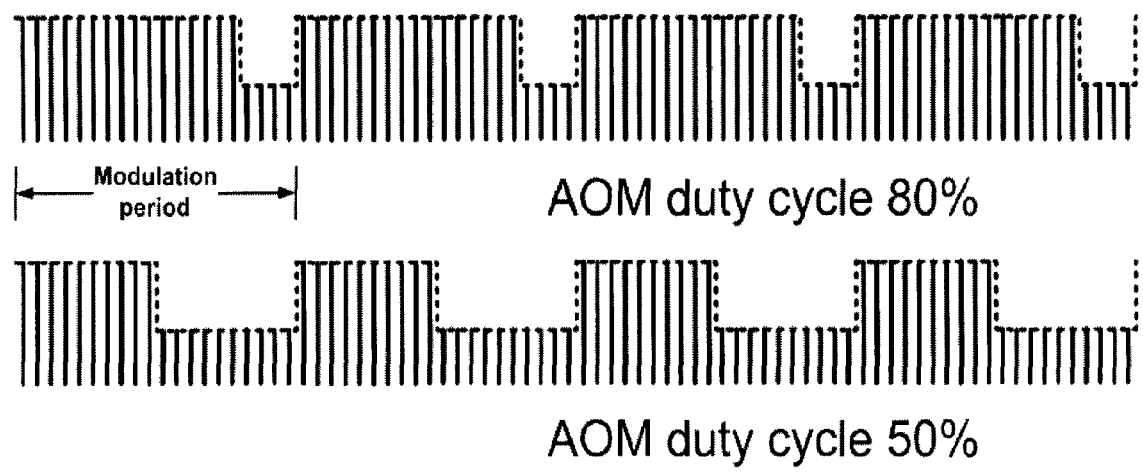
FIG. 4 illustrates a method of acousto-optic modulation (AOM) with periodic modulation of laser power at 45 and 100% is applied to the $0^{th}$ order diffracted laser beam, for conditions of 80% (top) and 50% (bottom) duty cycle.

FIG. 4 illustrates another modulation approach, with variable duty cycle as in the prior paragraph, but with laser power, intensity and/or pulse energy switched periodically between a maximum and minimum exposure, for example, of 100% and 50% (top and bottom figures). More generally, any level of modulation between 100%-0% and 100%-99.99% would suffice to produce, respectively, strong or weak gratings. This method provides means for controlling refractive index contrast between the high exposure voxels and the lower exposure waveguide background, as well as controlling the relative sizes of the high/low refractive index segments by the duty cycle.

FIGS. 5(a) to 5(d) show examples of other modulation profiles with additional advantages for controlling the periodic or modified periodic refractive index profiles of the segmented waveguides.

Figure 5:
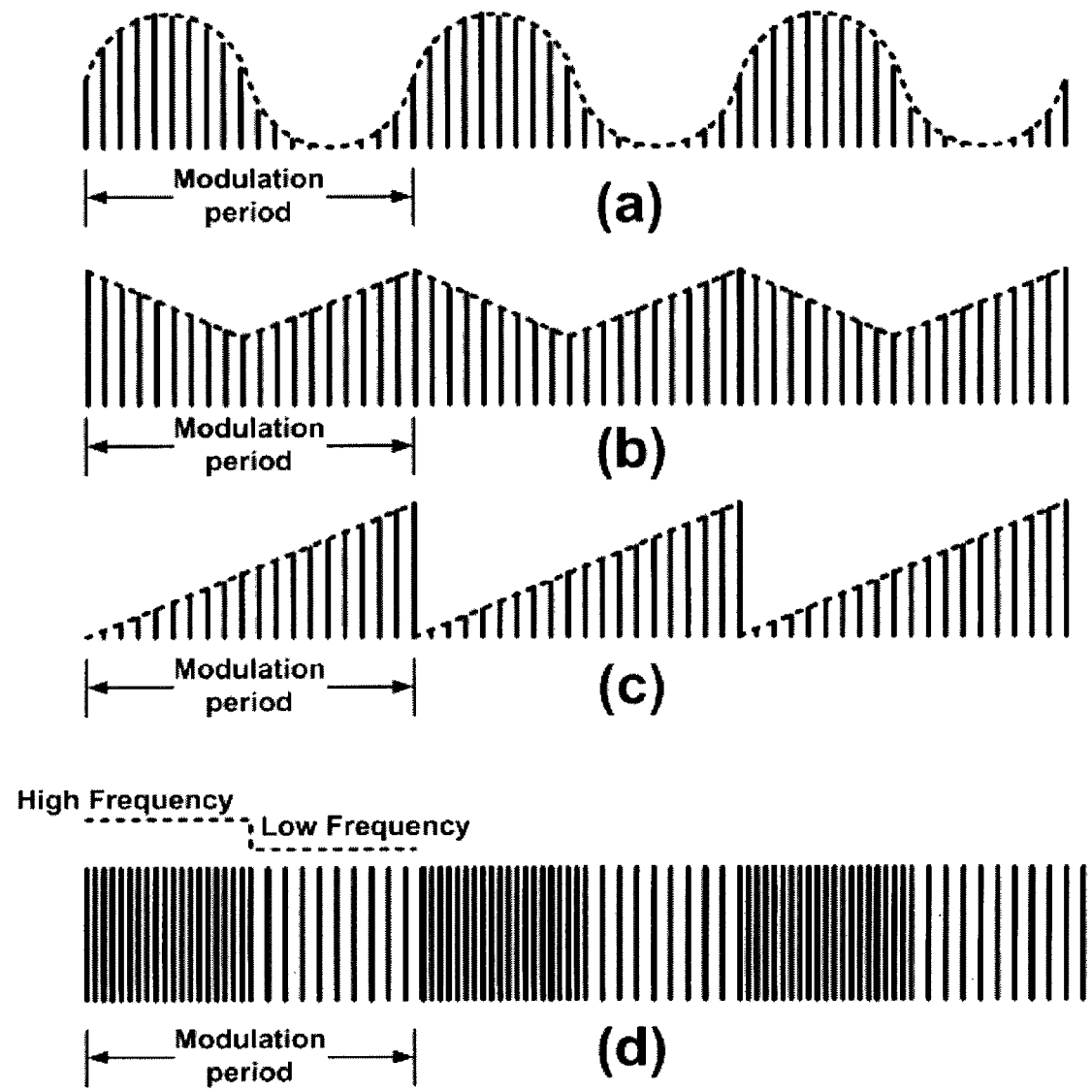
FIGS. 5(a)-(d) show other methods of modulation of the laser sources, namely: (a) sinusoidal 0-100%; (b) saw tooth 50-100%; (c) modified saw tooth (blazed for coupling or polarization control); and (d) frequency modulation with constant pulse energies.

The sinusoidal modulation of FIG. 5(a) demonstrates a sinusoidal modulation of laser power, intensity and/or pulse energy for similar benefits of controlling refractive index profile. In the case shown in the figure, 0-to-100% modulation depth is demonstrated to form individual voxels, but modulation depths of less than 100% (e.g. setting minimum exposure to 50% of maximum power) can also be applied to provide a baseline minimum change in refractive index.

The symmetric saw-tooth modulation of FIG. 5(b) provides linearly increasing and decreasing ramps in laser power, intensity and/or pulse energy to construct variable refractive index ramps as another means of controlling the blending of refractive index voxels and refractive index contrast along the waveguide.

The periodic linear ramps in FIG. 5(c) demonstrate a modulation technique for producing blazed grating profiles, attractive for efficiently coupling light into or out of waveguides, or controlling polarization properties of the waveguide grating.

An AOM also is operable to provide means for periodic variation of laser exposure repetition rate, for example, by modulating the frequency of the AOM at one half of the laser repetition rate to only pass every second laser pulse in each half cycle. This modulation is then cycled on and off at the modulation frequency required for Bragg grating resonance in the laser-formed waveguide. For the 50% duty cycle as shown in FIG. 5(d), each pulse is applied at full (100%) exposure, but delivers only one half of the laser pulses to the low exposure segments in comparison to the full exposure voxels. This modulation scheme can be widely varied to provide continuously varying laser repetition rate (sinusoidal, sawtooth, etc.), also with variable exposure level (0-100% to 99.99-100%) and duty cycle as described above, for far ranging control in the refractive index profile along the segmented waveguides.

GWs can also be fabricated by modulation of the relative speed of the sample and laser focal volume in axial (parallel to waveguide) and/or transverse (perpendicular to waveguide) directions during laser exposure. Modulation of laser pulse duration, for example by moving grating or prism compressors, will modulate laser absorption and provide segmented waveguide properties. Other GW fabrication methods include: (i) modulation of focal spot size and/or shape, for example, with varying telescope or aperture diameter; (ii) modulation of laser wavelength, for example, by varying a grating or other frequency selective component in the laser; and (iii) modulation of lens focusing (numerical aperture), for example, by moving lens.

Each of the modulation methods described above can be applied independently or in combination. Further, numerous other method for modulation of laser exposure are known in the art and are contemplated by the present invention, including Pockels cell modulation, galvanometers, rotating beam steering mirrors or polygons, mechanical shutters, moving variable or graded neutral density filters, tilting dielectric or interference mirrors, rotating dichroic optics, and rotating waveplates, to name only a few.

For example, a Pockels cell could be used to substitute the AOM in FIG. 2 for fast laser polarization modulation, or combined with a linear polarizer for high speed power modulation. Periodic polarization modulation (linear x, y or circular) is also available using rotating quarter or half waveplates, tilting or rotating dielectric-film polarizers, and liquid crystal displays to name only a few. Further, galvanometers, rotating beam steering mirrors or polygons could be applied to replace one or more of the turning mirrors in FIG. 2 to introduce speed modulations of the incoming laser beam, in a direction either parallel or with an angle (0 to 90°) to the sample scan direction Mechanical shutters, moving variable or graded neutral density filters, tilting dielectric or interference mirrors, rotating dichroic optics can also be employed for laser energy or scan speed modulation.

It should be understood that the above modulation schemes are representative and non-limiting examples that can be applied separately or in combination to fabricate discontinuous refractive index changes along the length in the laser-formed waveguides. Each case provides periodic or modified periodic termination or partial modulation of laser exposure conditions during waveguide writing by various means (power, intensity, energy, polarization, relative sample motion speed, pulse duration, focal spot size or shape, laser wavelength, focusing lens). The modulation methods also apply to continuous waveguides with periodically changed properties that define a grating and a waveguide device.

It should also be understood the each of the modulation methods mentioned above is not restricted solely to modulation of waveguide refractive index, and include periodic or modified periodic changes in other waveguide properties, for example, including waveguide diameter, physical shape, symmetry, stress, absorption, damage, and birefringence. The grating response will be controlled a combination of all of these factors in varying degrees, as controlled by the modulated laser exposure conditions.

It should also be understood that the present invention is not limited to any particular scanning technique for the laser. For example, the use of a galvanometer or prism or polygon or acousto-optic beam scanner as the effective turning mirror in the laser beam delivering path is one means of moving the laser focus spot relative to the bulk material.

In another embodiment, the sample may be moved within a stationary focal volume. In yet another embodiment, a technique combining moving the sample and the beam may be employed. Frequency modulation of any one or combination of these methods provides a means for creating segmented waveguides.

Figure 6A:
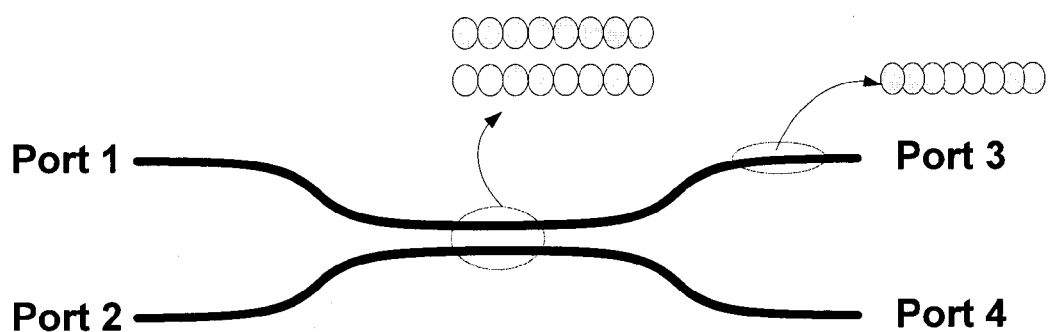
FIGS. 6(a)-6(i) illustrate schematics of devices incorporating the GW structures of the present invention: (a) symmetric directional couplers which serve as add/drop devices; (b) asymmetric direction coupler for spectral shaping of add/drop devices (c) splitter (Y junction) with filtering function; (d) asymmetric splitter that has GW structures of different period or different size (refractive index changes) on the two branches; (e) ring resonator comprising GW structures and coupled to a second GW waveguide; (f) ring resonator comprising an asymmetric coupling between the GW ring and a straight GW waveguide, with different period, size or value of refractive index volume; (g) an apodized GW Bragg reflector within a GW of different resonance; (h) a GW mode converter; and (i) a chirped GW for dispersion compensation.
Figure 6B:
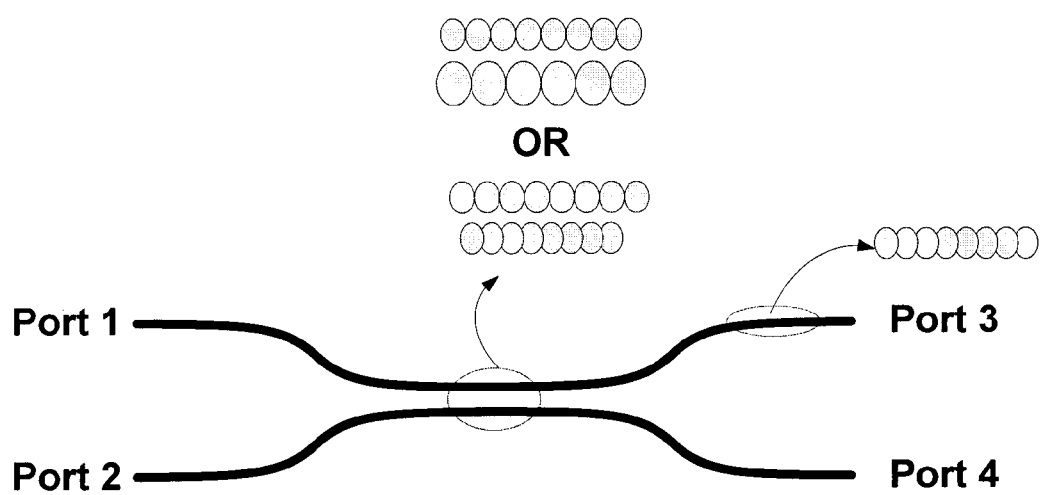

The present invention can be implemented to fabricate a plurality of optical devices, including, as an example, the directional couplers shown in FIG. 6(a). By using slightly different scan speeds in the center coupling region with respect to the rest of the structure, light with similar wavelength as the Bragg wavelength of that region $\lambda_B$ will only be reflected by the center. Then the coupling length of the coupler could be designed to realize add/drop function in optical communication: for all light entering port 1, only light with wavelength very near $\lambda_B$ will be reflected and dropped at port 2, while the rest of the light at other wavelengths will pass to port 4. Further, for all light entering port 3, only light with wavelength very near $\lambda_B$ will be reflected and dropped at port 4, while the rest will pass to port 2. Further, an asymmetric coupler with different GWs responses in the top center and bottom center part of the coupler due, for example, to different separation (period) or different sizes or different refractive index changes, as illustrated in FIG. 6(b), will render similar performance, but additional possibilities for spectral shaping of the coupler response.

Figure 6C:
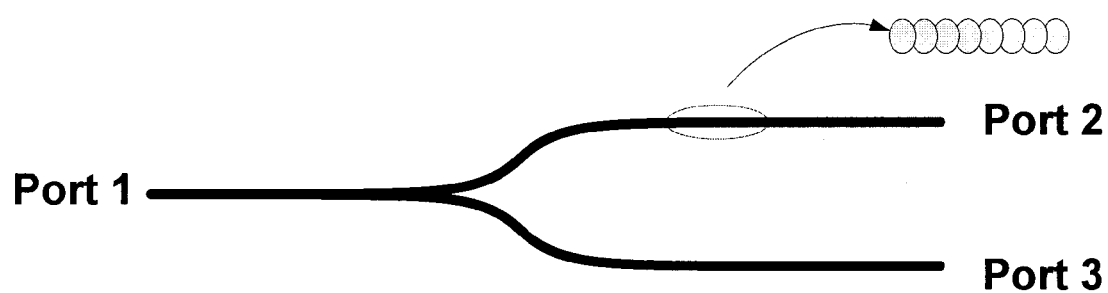
Figure 6D:
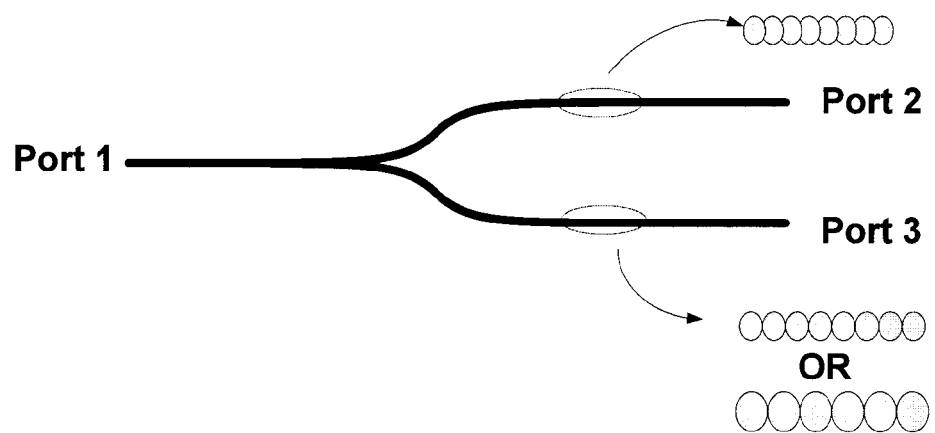

The invention can also be used to fabricate a symmetric splitter with filtering function, as illustrated for the symmetric splitter in FIG. 6(c). Light with the Bragg wavelength of the top or bottom branch of the structure will be reflected back to port one. If the Bragg wavelength of the two arms are designed to be different, for example by varying scan speed or laser intensity, then the output light in port 2 and port 3 will separate the light with different intensity ratios at different spectral regions—the corresponding Bragg wavelength of one arm will reject light at the Bragg resonance while the other arm will pass the same wavelength in an asymmetric splitter as shown in FIG. 6(d).

Figure 6E:
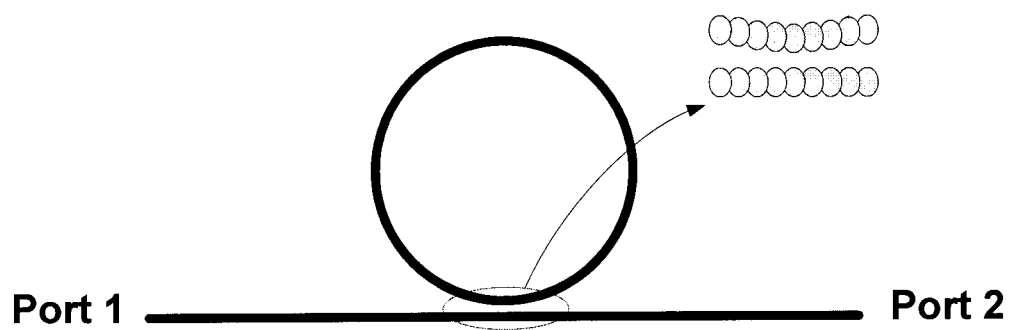
Figure 6F:
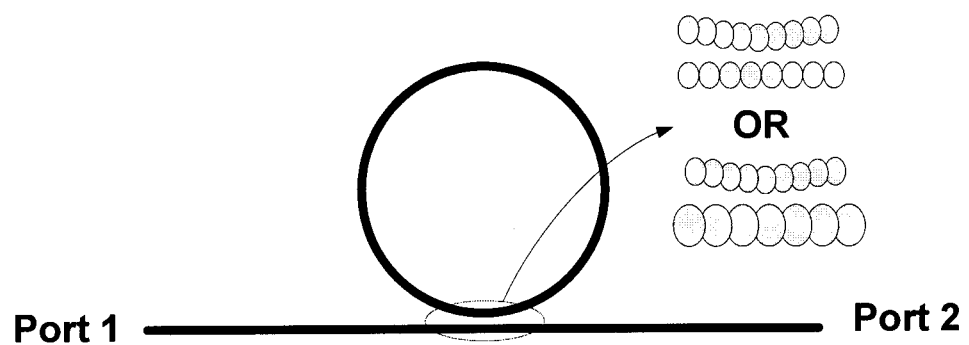

Another example device based on the present invention is the ring resonator structure shown by FIG. 6(e). The coupling length and waveguide separation defined by the GW ring and GW waveguide could be designed to reject a particular wavelength $\lambda_B$ while also delaying the remaining light that would normally couple into the ring resonator. The interference between the GW $\lambda_B$ and the wavelength resonance of the ring resonator permits new means of spectral shaping control of the delay response of the loop with respect to coupling from and back to the straight GW waveguide. In this way, a delay line filter for the particular wavelength $\lambda_B$ is defined as one example of application where all the wavelengths other than $\lambda_B$ are delayed. An asymmetric ring structure can also be made if the GWs in the ring and the straight waveguide have different GW responses due, for example, to different separation or different sizes or different refractive index changes, as illustrated in FIG. 6(f).

Figure 6G:
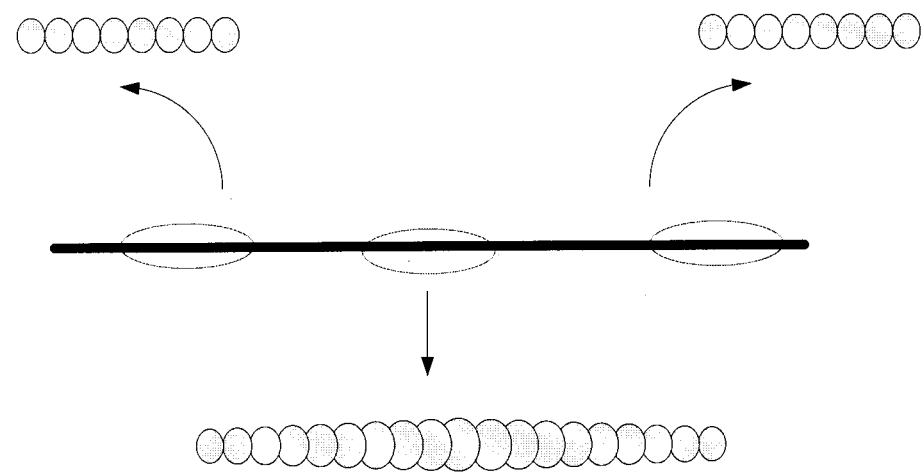

The invention can also be used to fabricate an apodized GW as shown in FIG. 6(g). The peak intensity of the scanning laser could be modulated as a sinc-squared function so that the size or index changes of the laser modified volumes follow the same modulation. This way, an apodized GW can be realized with spectral shaping control function, by means well known to an optical practitioner.

Figure 6H:
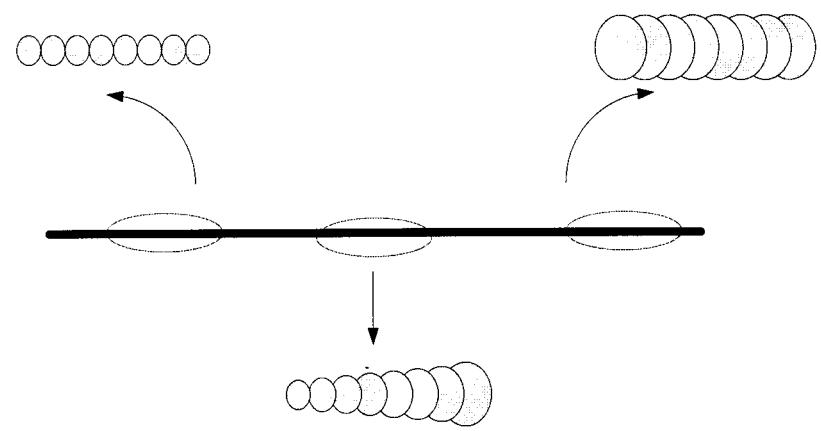

Another device that can be made using the current invention is the mode converter as shown in FIG. 6(h). By fabricating a central segment of GW with smoothly varying GW response, adiabatically mode conversion is possible in matching the modes and providing high coupling for light entering port 1 in one type of GW segment and exiting at port 2 in another type of GW segment.

Figure 6I:
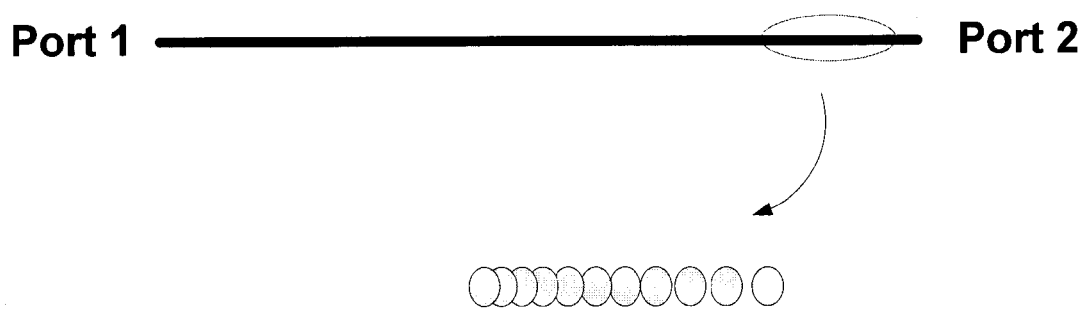

In addition, by adiabatically increasing or decreasing the separation among the laser-modified volumes, which could be realized, for example, by accelerating or decelerating the scanning stages supporting the sample during the exposure, a chirped GW can be made to realize the function of dispersion compensation in optical communication systems because light with different wavelength will be reflected at different GW positions and the dispersed pulse will be compressed to its original width on time domain (see FIG. 6(i)).

It should be understood that in accordance with the present invention "single pulse" exposures can be considered as "single energy units" comprising more than one divided pulses. Each of the refractive index voxels that compose the GW devices can hence also be formed by multiple lower energy laser pulses, a burst of laser pulses, or similar representations of other energy sources.

Other photonics devices are contemplated by the present invention, including, for example, the creation of distributed sensor networks composed of a mesh of GWs with various periods written inside a bulk material so that local stress, strain or temperature could be pinpointed to every position where a physical process happens.

Advantageously, this method can form a variety of single- or multi-mode waveguides together with a variety of gratings and generally any type of periodic or "modified period" optical structures inside transparent media.

It should be understood that the powerful and controllable laser interactions used in accordance with the present invention yield strong photosensitivity response. Photosensitization enhancement is generally not required. Sufficient refractive index change ($\Delta n > 10^{-4}$) for optical guiding is typically generated by absorption of laser energy in or near a laser focal volume, through various means, including nonlinear optical absorption for short-pulse sources of typically less than 10 ps pulse duration, photochemical defect generation with short wavelength ultraviolet lasers spectrally tuned to near the band edge, or other lasers tuned near defect levels or other absorption mechanisms allowed in the substrate. Nonetheless, photosensitization enhancement of various optical materials is also contemplated for the present method to improve the writing speed, grating strength, waveguide losses, and other optical properties of the GW devices.

Further, the present invention contemplates writing grating waveguides in a variety of materials, including: (i) various types of glass; (ii) polymers; (iii) crystals, including lithium niobate, doped/undoped sapphire, KGW, BBO, LBO, etc.; (iv) semiconductors, including silicon, gallium arsenide, indium phosphide, germanium, etc.; or (v) any other type of material which can be processed by laser in accordance with a method described herein. In a broad range of materials, optical active materials for forming laser waveguides or waveguide amplifiers, electro-optic materials for forming modulators, optomagnetic materials for forming waveguide Faraday rotators, birefringent materials for forming birefringent or polarization maintaining waveguides, semiconductors for forming electro-optic absorbers are several examples of the optical devices contemplated by this invention.

The present method also contemplates integration of GW devices to create linear, planar (2-D), and 3-D integrated optical circuits. Such optical systems are of broad significance and importance to applications in optical communications and optical sensing.

The present method also contemplates formation of GW devices inside the cladding of optical fibers as well as through the guiding core. This includes but is not limited to single mode and/or multimode glass and crystal fibers, liquid-core waveguides with transparent cladding, and photonic-bandgap (holey) fibers. In this way, optical circuits can be added to the fiber that couple to the pre-existing core waveguide to enhance optical functionality of the fiber. As an example, formation of GW devices and/or integrated GW systems in the fiber cladding facilitate new means of forming optical taps and generally provide coupling of light to or from the fiber core to other optical devices that is presently very difficult with most types of optical fibers used today. Further, the formation of GW near the surface of the cladding provides means for creating optical sensors for probing the fiber surface or local ambient through evanescent fields of the GW device, which, in turn, is conveniently coupled to the fiber core for external optical interrogation.

The present method can be implemented in two-dimensions, for example, in planar optical waveguides such that waveguides and grating devices are simultaneously written within the or near the plane to form planar lightwave circuits. The present invention can also be implemented to fabricate a range of optical devices, including but not limited to directional couplers, symmetric or asymmetric splitters, ring resonators, apodized or chirped grating waveguides, with same or different period, modulation strength, waveguide sizes, or positions in different part of the devices.

Other photonics devices are contemplated by the present invention, including, for example, the creation of sensor networks compose of a mesh of GWs with various period written inside a bulk material so that local stress or temperature changes could be pinpointed to the every position where the physical process happens. Other applications include 2-D arrays of laser modification volumes that define planar waveguides with embedded gratings. Another application includes 3-D arrays of laser modification volumes that define large volume light guiding paths, for example, multi-mode waveguides or photonic bandgap structures, all characterized by embedded gratings. The application of the present invention to alternative devices will be readily apparent to a person of skill in the art.

The present invention contemplates a variety of laser sources, including but not limited to: (i) pulsed laser sources, including pulsed ultrashort, extreme ultraviolet, ultraviolet, infrared sources; and (ii) modulated continuous laser sources that provide two or more modulations of exposure conditions during writing of one waveguide segment. These include, as an example, temporal modulation of a continuous $CO_2$ lasers or ultraviolet lasers to provide two or more exposure fluctuations, such as laser power, to give a pulse-like performance during formation of each refractive index voxel of the waveguide. The method also includes modulation of pulsed lasers operating over a wide range of repetition rates, including high (10 GHz) to low (1 Hz) frequencies, such as to deliver two or more laser pulses to each voxel segment during waveguide formation.

The present invention can also apply to direct writing with other sources, including electron beam, atom beam, ion beam, or x-ray. The variety of sources that could be applied in accordance with the present invention leads to a broad range of compatible substrate materials, including but not limited to glasses, crystals, semiconductors, polymers and multi-layered materials.

The present invention is directed at fabrication of optical sensors or filters which are widely used in biological, structural, physical, electrical and many other forms of optical sensing. The present invention may also be used to provide lower cost optical multiplexing, add/drop, and laser mirror devices that enable lower cost procedures for integrating more optical devices into smaller and more robust packages. The immediate application is short-haul coarse wavelength division multiplexing system and semiconductor laser distributed mirrors. Other potential applications include the fabrication of optical backplanes for computers and chip-to-chip optical communication systems on hybrid electric-optical circuit boards that are expected to emerge in the near future.

As particularized in the examples below, the present invention teaches a single-step, direct-write method and a system of GWs and permits optical waveguides to be formed simultaneously with periodically or modified periodically optical devices. The present invention applies to all laser source types, discussed below, that interact with transparent or partially transparent materials when focused into the bulk with appropriate exposure condition. The optical device structure consists of highly, partially or non-overlapping laser modified volumes, which suits applications as optical filters, photonic bandgap structures, optical defects, Bragg mirrors, dispersion compensators, mode converters, optical demultiplexers, metamaterials, and so on. This production convenience offers dramatically lower production cost and faster fabrication time. Grating periods can be varied to desired values to form highly complex optical circuits. The method enables optical circuits to be fabricated in compact 3-D geometries, enhancing performance and enabling new optical devices to be considered.

Example 1

A grating waveguide fabrication method and system to produce modulation of refractive index and/or other waveguide properties by periodic or modified periodic modulation of a energy source (e.g., a laser) was demonstrated. This method can be applied to both low and high repetition rate laser systems and continuous wave laser systems. Low-loss and high-strength Bragg grating waveguides were fabricated in fused silica glass with a commercial high-repetition rate, fiber-amplified laser. The method can easily be adapted to other laser sources and materials.

FIG. 2 illustrates a system in accordance with an embodiment of an aspect of the present invention. A commercial amplified fiber laser (IMRA America™, model µJewel-400) provides 1045 nm wavelength of ~400 fs pulse duration from an external compressor, with tuneable repetition rate from 100 kHz to 5 MHz and with $M^2$ beam quality value of ~1.3. In the present example, a 500 kHz repetition rate was applied, but other frequencies are also possible. The 5-mm diameter beam is reduced with a telescope (T1) to 1-mm diameter and modulated by an acousto-optic modulator (AOM) prior to beam expansion to original size by telescope T2. The modulated 0th order or 1st order diffracted beams are focused (L1) into a LBO frequency doubling crystal to generate 522-nm light, collimated with lens L2, and then attenuated with a neutral density filter (ND) or a combination of half-wave-plate and linear polarizer (not shown). The beam is directed by turning mirrors (TM) to the focusing lens, and focused to ~75 µm depth below the surface of an optically transparent sample. Motion control of the vertical position of the focusing lens and x-y transverse position of the sample provides for grating waveguide fabrication in 3-D directions.

The beam size was reduced to ~1 mm diameter through the input telescope (L1 and L2) to enable the ~150 ns rise time of the AOM (NEOS™ 23080-3-1.06-LTD) in FIG. 3 to provide selection and/or attenuation of single laser pulses from the continuous train of laser pulses arriving at up to the maximum 5 MHz repetition rate. Acoustic waves generated by a piezoelectric transducer diffract up to ~60% of the incident laser beam into a $1^{st}$ order at a small angle θ from its original direction. The modulator offers ~500 ns on-off response time, providing variable power delivery in the range of 0 to 60% of incident power in $1^{st}$ order, or 40 to 100% of incident power in $0^{th}$ order.

The AOM was externally triggered by a function generator delivering square wave forms at 500 Hz frequency with duty cycle tuneable from 0-100%. As FIG. 3 illustrates, the AOM provides a $1^{st}$ order diffraction beam for an 80 MHz AC radio frequency with a measured ~55% maximum laser power efficiency. The $1^{st}$ order laser power could then be modulated from a minimum 0% to a maximum 55% of incident laser power, effectively constituting 0% to 100% modulation power at the waveguide sample. Alternatively, the non-diffracted beam in the $0^{th}$ order beam path of FIG. 3 could be selected to provide power modulation in the range of ~45% to 100% of relative full power. The $1^{st}$ order diffracted beam was selected and re-collimated to its original ~5 mm diameter with a second telescope (L3 and L4).

To drive stronger nonlinear absorption in the fused silica glass and thus produce lower-loss and stronger guiding structures, the laser was frequency doubled in 3 mm thick lithium triborate (LBO) crystal. A pair of convex lenses focused the beam to ~100 µm diameter in the LBO crystal, and a second telescope (L5 and L6) re-collimated the beam. The 522 nm laser power was adjusted by a half-wave plate and a linear polarizer or neutral density filters. A 0.55-numerical aperture (NA) aspheric lens focused the laser to ~1 µm diameter ($1/e^2$ intensity) at 75 µm below a fused silica glass sample (Corning™ 7980, 25 mm×50 mm×1 mm). The sample was mounted on a 3-D motion stage (Aerotech™ ABL1000 with 50-nm repeatability), and the waveguides were written transversely with the laser polarization perpendicular to the translation direction being one preferred embodiment, although linear polarization parallel to the translation direction as well as circular polarization was also applied. The maximum 522 nm laser power of ~100 mW was available in a $1^{st}$ order beam (~55% transmission) from the AOM.

Following waveguide formation, the sample was ground and polished at the waveguide end-facets, and characterized for their guided mode profiles, propagation losses, and grating spectral responses using known techniques. All spectra were recorded with an optical spectrum analyzer (Ando™ AQ6317B) with index matching fluid applied between standard Telecom fiber and laser-formed waveguides to reduce Fresnel reflection and Febry-Perot effects.

One near-optimum exposure condition for forming low-loss waveguides in fused silica occurs at a laser power of ~175 mW and 1 MHz repetition rate, providing 175 nJ energy per pulse. However, attenuation in the AOM (55% transmission in $1^{st}$ order) reduced this energy below optimal. A 500 kHz laser repetition rate was used in the present example to provide on-target exposure up to 200 nJ pulse energy and ~100 mW power, exceeding an optimum waveguide writing power of 75 mW at this repetition rate.

Waveguide or damage tracks can be formed across a wide range of scan speeds of 0.1 to 200 mm/s and other laser exposure conditions. For guiding 1560-nm light, good quality optical waveguides without embedded gratings is available in a more narrow range of exposure conditions. Continuous (non-grating) waveguides having low propagation loss of <0.5 dB/cm and mode size (~11 µm diameter) well matched to Telecom fiber were generated with 75 mW power at 522 nm laser wavelength, 500 kHz repetition rate, ~0.25 mm/s scan speed, 400 fs pulse duration, and 0.55 numerical aperture focusing to ~1 µm spot diameter.

This example demonstrated the formation of segmented (voxel array) waveguides by AOM power modulation of 0% and 100% as depicted in FIG. 1 (top and bottom) for $1^{st}$ order diffraction, with duty cycle adjusted anywhere from 20% to 100%.

To provide Bragg wavelength resonances of 1550 nm, in the Telecom band, the index modulation period Λ, must be set near 535.6 nm for an effective index of $n_{eff}$=1.445 that is close to the refractive index of bulk fused silica (1.444). The grating period of the waveguide is variable, and defined by the AOM modulation rate, f, for varying the laser exposure condition and the scan velocity of v≈0.25 mm/s, selected above, by Λ=v/f. The Bragg condition, $\lambda_B=2n_{eff}\Lambda=2n_{eff}v/f$, then provides multiple combinations of exposure conditions from which f=500 Hz is selected to match the v=0.2678 mm/s scan speed, near the optimum for low loss waveguiding at 500 kHz laser repetition rate.

FIG. 1 (top or bottom) indicates that laser exposure is fully terminated by the AOM for short intervals during laser writing. The vertical solid line height represents the laser pulse energy measured from a high-repetition rate laser as a function of time while the dashed line shows the AOM transmission envelope for continuous 'on' condition (top), and periodically modulated conditions for 80% (middle) and 50% (bottom) duty cycle. For this example, vertical lines in the figure depict the delivery of individual laser pulses arriving at 500 kHz repetition rate in periodic bursts defined the duty cycle and AOM frequency, f. For the case of 80% duty cycle and f=500 Hz AOM modulation rate, a total of 800 pulses are delivered in each burst, thus leading to the controlled formation of a modification volume near or in the laser focal volume, and providing refractive index and/or other permanent modification of the material compared with the surrounding bulk. This modification volume defines a single refractive index voxel in one embodiment of the invention, and when repeated each cycle of the AOM modulation frequency during relative scanning go of the laser and/or sample with respect to each other, leads to the formation of segmented (voxel array) waveguides providing grating spectral response.

Figure 7:
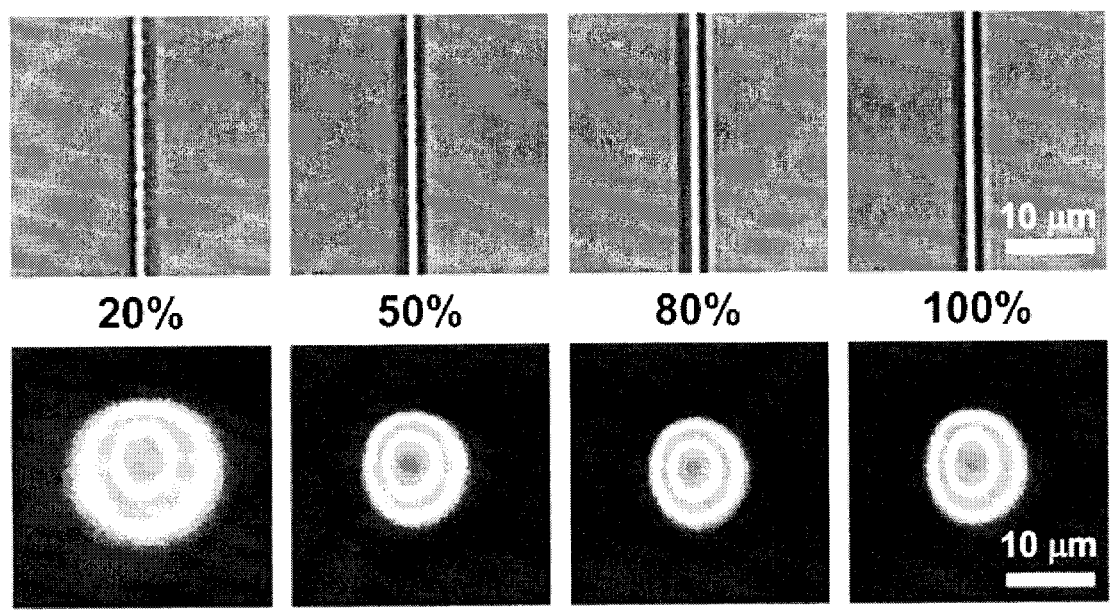
FIG. 7 illustrates overhead optical microscope images (top row) of the GWs for 20, 50, 80, and 100% AOM duty cycles (left to right), recorded with a 40× objective, and the respective near-field guided mode profiles (bottom row), recorded at 1560 nm wavelength.

The duty cycle of the AOM has a strong effect on waveguide properties as demonstrated in FIG. 7. The top row shows microscope images (40× objective) of the GWs in transverse view, written with 20, 50, 80, and 100% duty cycle (left to right). A decrease of the AOM duty cycle reduces the net laser power delivered to the sample, manifesting in weaker contrast in the appearance of the waveguides and reduced uniformity (increased discontinuities) along the waveguide, particularly in the 20% duty cycle case. Such inhomogeneous features are often associated with higher loss waveguides due to optical scattered at the discontinuities.

Near-field guided modes for these waveguides at 1560 nm are shown in the bottom row of FIG. 7. The 500 kHz repetition rate laser was modulated by the AOM in $1^{st}$ order at 500 Hz modulation rate using full 0 to 100% modulation as shown in FIG. 1. The average on-target laser power was 75 mW reduced by the associated modulation duty cycles to 15, 37.5, 60, and 75 mW, respectively, for the four waveguides. The sample was scanned at 0.2678 mm/s speed transversely to the laser propagation direction. The modes can be well-represented by Gaussian profiles in both transverse directions and seen to have near-symmetric ~1.1 aspect ratios (vertical diameters slightly larger). The mode profiles are relatively similar for 50 to 100% modulation, but increases sharply from ~12 μm diameter at 100% duty cycle to ~18 μm at 20% duty cycle due to much lower total laser exposure at lower duty that reduces the average refractive index change along the waveguide. By matching the 12 μm mode profile for the 100% duty cycle to waveguide modeling software (Lumerical MODE Solutions™), a refractive index change of ~0.01 is estimated for the present laser-formed waveguide. FIG. 7 indicates an increase in the average waveguide refractive index change with increasing duty cycle.

Figure 8:
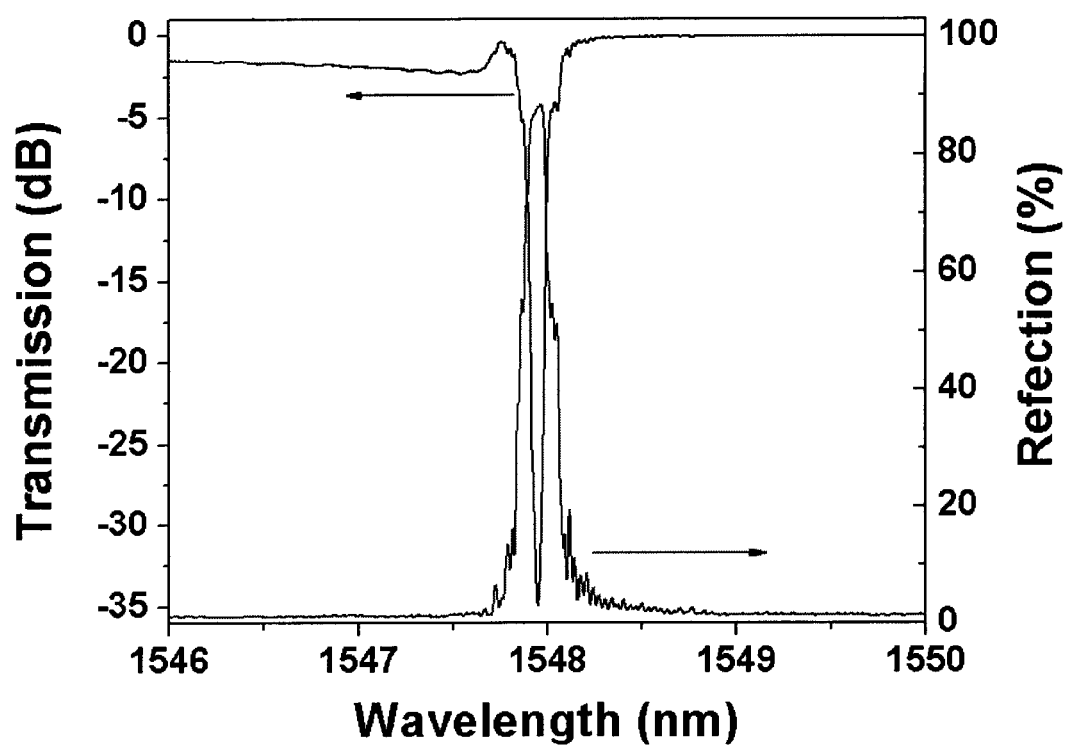
FIG. 8 illustrates near-infrared transmission and reflection spectra recorded from a 25 mm long GW written with a frequency-doubled laser (522 nm) with a 40× (NA 0.55) focusing lens.

FIG. 8 illustrates transmission and reflection spectra, recorded from a waveguide formed with 60% duty cycle. The AOM modulation rate was set to 500 Hz with 60% duty cycle and 0 to 100% modulation depth. The average laser power at target was 45 mW and the sample was scanned at 0.2678 mm/s transversely to the laser propagation direction. A strong transmission resonance of 35 dB attenuation and reflection peak of ~90% is recorded at 1547.95 nm, matching the expected Bragg wavelength of $\lambda_B=2n_{eff}\Lambda=2n_{eff}v/f$=1547.96 nm. The narrow 0.2 nm bandwidth (3 dB) and absence of secondary peaks or shoulders attests to the high stability of the present exposure method in maintaining a coherent periodic modulation of $\Lambda$=0.5356 μm period along long lengths (~1 cm) of the waveguide, while the single resonances is evidence of very low waveguide birefringence discussed further below. Compared with the BGWs written with a point-by-point writing method using a similar pulse duration of ~320 fs, the grating formed by such modulation method is two-order of magnitude stronger.

The transmission spectrum in FIG. 8 indicates a ~2 dB radiation mode loss on the shorter wavelength side of the Bragg resonance. The spectrum was normalized to 0 dB loss at longer wavelength, but which represents a total insertion loss (fiber-to-GW-to-fiber) of ~2 dB for the present case of a 5 cm long GW.

Accordingly, the presence of strong Bragg grating resonances in FIG. 8 suggest the formation of isolated or partially isolated refractive index voxels in or near the laser focal volume. The average refractive index change of 0.01 inferred above for 100% duty cycle now indicates a strong AC refractive index modulation with peak values of Δn=~0.01 expected for the present 60% duty cycle. As such, optical guiding and periodic refractive index modulation is demonstrated simultaneously in a single laser exposure step to induce strong Bragg grating response and low-loss optical guiding.

Figure 9:
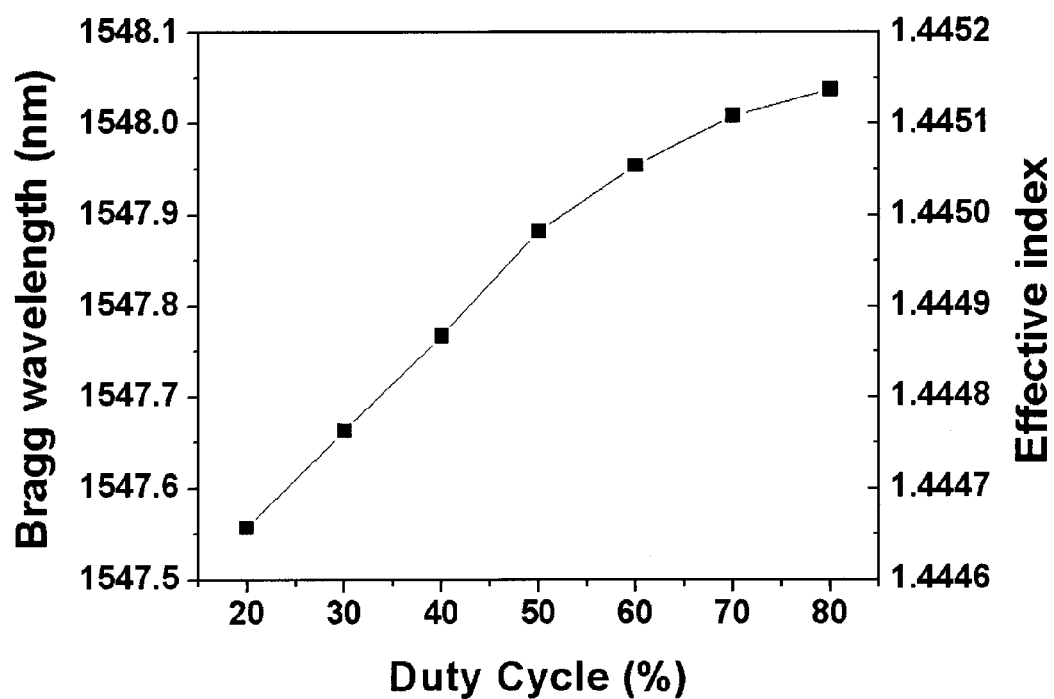
FIG. 9 illustrates the Bragg wavelength dependence of the grating waveguide on the AOM modulation duty cycle and the inferred effective index of the waveguide.

The average effective refractive index of the grating waveguides follows changes in the voxel size, voxel period, and material modification that is generally controllable by laser exposure condition. The GW effective refractive index, $n_{eff}$, can be inferred directly from the Bragg wavelength according to $\lambda_B=2n_{eff}\Lambda$, where $\Lambda$=535.6 nm was discussed above. The observed changes in Bragg wavelength and effective index are shown in FIG. 9 as a function of the AOM duty cycle. (The laser exposure condition and the AOM operation were the same as described in FIG. 8 except that more values of AOM modulation rate were tested here.) Below 50% duty cycle, the increase of the Bragg wavelength and effective index is linear with the duty cycle, which, in turn, shows a linear response of this DC index change ($n_{eff}$) to the average applied laser exposure power (proportional to duty cycle). The data extrapolates to intersect the wavelength axis at 1547.34 nm, which marks the native refractive index of the bulk fused silica glass of 1.444. At duty cycles higher than 50%, the effective index deviates from this linear increase due in part or wholly to more overlapping of the individual voxels and saturation of the available refractive index change.

Figure 10:
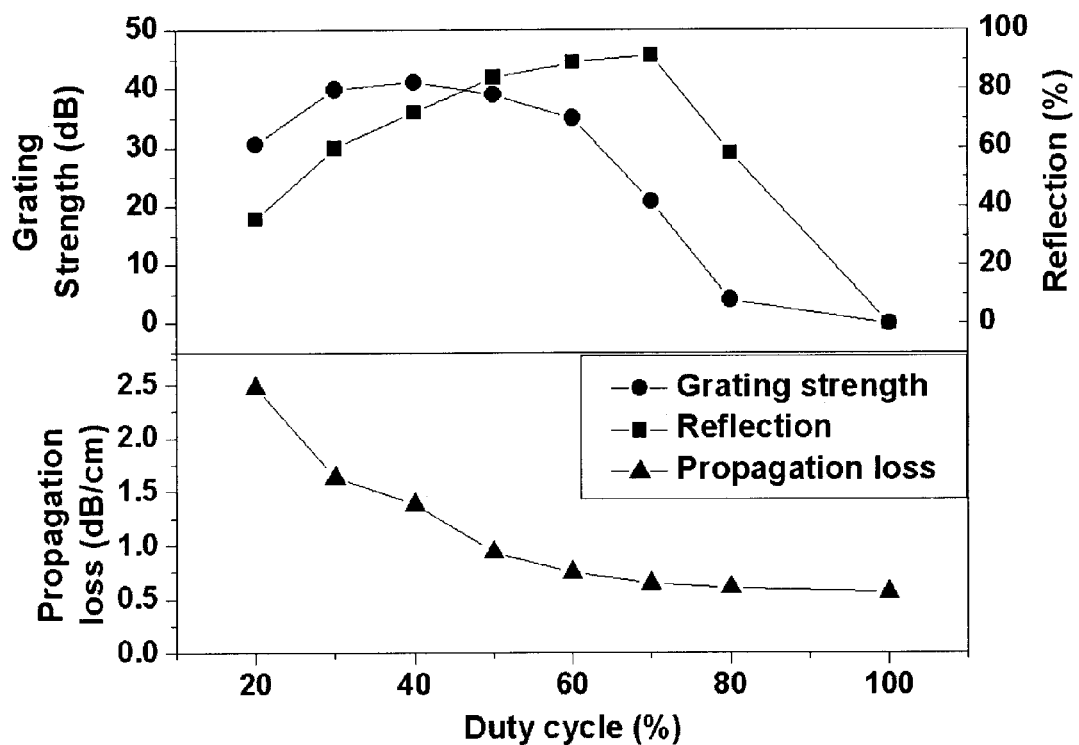
FIG. 10 illustrates the dependence of peak Bragg grating strength (top) in transmission (dB) and reflection (percent), and the waveguide propagation loss (bottom) (dB/cm) with respect to increasing AOM duty cycle.

FIG. 10 illustrates the change of grating strength in transmission and reflection (top graph) and the propagation loss of the GWs (bottom graph) with respect to increasing AOM duty cycle for GW writing with laser conditions similar to FIG. 9. While stronger gratings are expected with decreasing duty cycle (due to a stronger AC refractive index modulation), sharply increasing waveguide losses (bottom) below 60% duty cycle limit the practical range for strong Bragg reflection to ~70% duty cycle for a 91% reflection peak and ~40% duty cycle for a maximum 40 dB attenuation peak in transmission. These values will vary with the laser exposure conditions. The propagation loss increases significantly from 0.5 dB/cm for smooth waveguides (100%) to 2.5 dB/cm for 20% duty cycle. As noted in the microscope images in FIG. 7, visible discontinuities in the waveguide are likely responsible for increased scattering loss in waveguides formed a lower, particularly 20%, duty cycle. On the other hand, the grating strength increases rapidly as the duty cycle decreases from 100% to ~60% duty cycle as large AC refractive index modulation is weakly and then strongly introduced into the waveguide. The grating strength peaks 41.2 dB with 70% reflection for 40% duty cycle, decreases thereafter due to weaker guiding (lower effective index as in FIG. 9) and higher propagation loss (lower graph). The lower ~70% duty cycle for optimizing the reflection at 90% arises from higher demand on efficient Bragg reflection into backward propagating waveguide modes that competes with scattering and radiation mode losses from distortions in the voxel shape; in the case of transmission, reflection, scattering and radiation mode losses collectively contribute to strong Bragg resonances.

Accordingly, the duty cycle for modulation of the laser exposure is an important control parameter which affects key aspects of the Bragg GW performance such as grating strength (FIG. 10), waveguide loss (FIG. 10), mode size (FIG. 7), Bragg wavelength (FIG. 9) and effective index (FIG. 9), to name only a few properties for GW waveguides. FIG. 10 further illustrates a trade-off between optimization of grating strength and minimization of waveguide propagation loss. In the present example, 60% duty cycle offers a practically useful combination of strong Bragg resonance (35-dB strength, 89%-reflection) and moderately low loss (0.7-dB/cm) guiding, while further improvement in strength and lower loss can be expected with further tuning of laser exposure conditions or application in other materials.

Example 2

This example is an extension of Example 1 which demonstrates the flexibility of the present GW formation method in controlling waveguide properties and integrating multiple GW devices to form highly stable optical systems.

Figure 11:
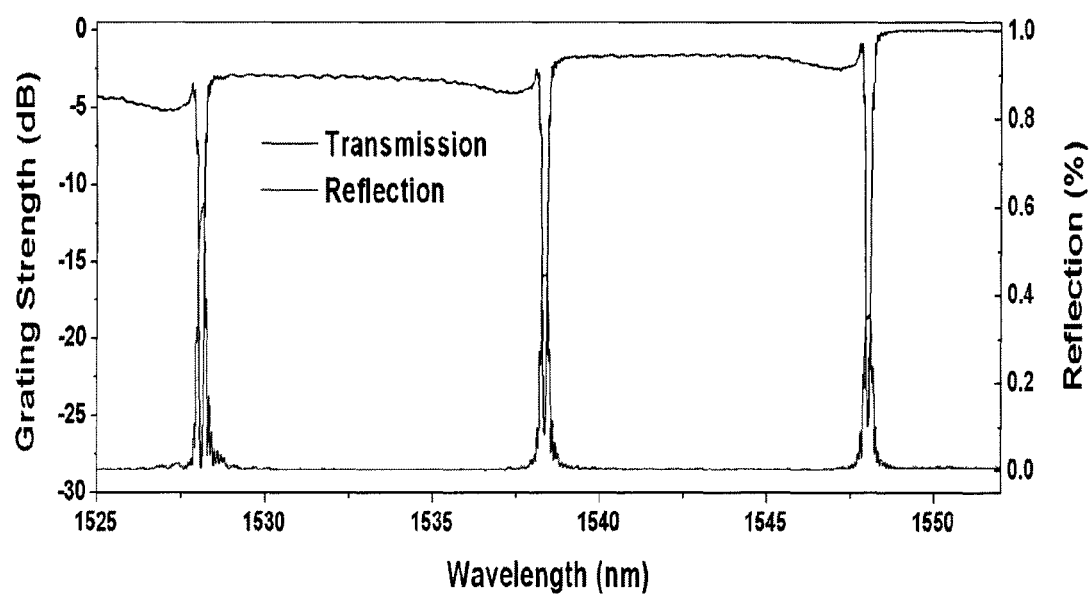
FIG. 11 illustrates the cascading of three serial Bragg grating waveguides with different Bragg resonances at 1523.1, 1538.3, and 1548.0 nm (seen both in transmission and reflection) formed in a single writing process.

FIG. 11 illustrates the transmission and reflection spectra of several grating waveguide devices formed in series in a straight line in bulk fused silica glass. Each waveguide section was 8 mm long and formed with an AOM modulation rate of 500 Hz and a fixed duty cycle of 60%, using laser exposure conditions similar to that described in Example 1. However, the scan speed was varied in three steps of v=0.2643, 0.2661, and 0.2678 mm/s, yielding three distinct and separated Bragg resonances at $\lambda_B$=1523.1, 1538.3, and 1548.0 nm, that accurately track the expected relationship of $\lambda_B=2n_{eff}\Lambda=2n_{eff}v/f$. The grating strengths for all three resonances exceed 20 dB and provide sharp resonances of ~0.3 nm spectral width (3 dB), indicating facile means for integration of multiple Bragg WG devices in a compact device.

Figure 12:
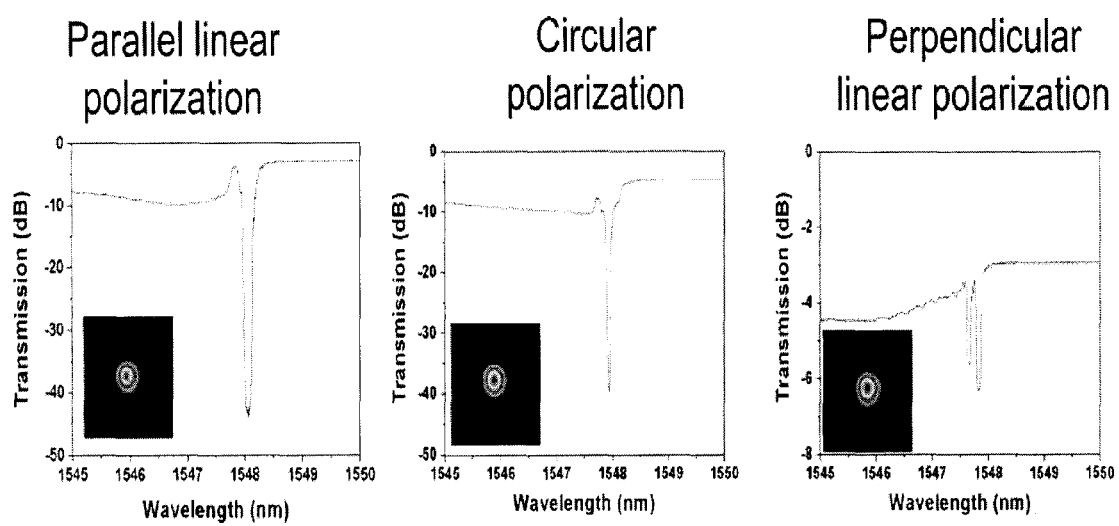
FIG. 12 illustrates the effect of laser polarization on the grating waveguide transmission spectrum and mode profile for otherwise identical laser exposure conditions.

FIG. 12 illustrates the strong effect of laser polarization on the grating waveguide transmission spectrum. For either linear polarization aligned parallel with the waveguide scan direction (left) or circular laser polarization (middle), one obtains strong single-line grating responses of ~40 dB in narrow ~0.2 nm spectral bandwidth (3 dB), whereas linear polarization perpendicular to the scan direction (right) yields only weak grating response (~2 dB) and dual wavelength resonances. This 0.17 nm separation corresponds to a $\Delta n_B$=3.2×10$^{-4}$ birefringence in waveguide effective index for transverse electric and transverse magnetic modes.

The linear polarization aligned parallel with the waveguide scan direction and the circular laser polarization both provide a strong Bragg grating response of greater than 35 dB, and sharp ~0.2 nm resonances in 3 dB bandwidth. In contrast, linear polarization perpendicular to the scan direction resulted in weak grating responses of 3.4 dB, although overall guiding was not adversely affected by a much lower refractive index change as attested by the similarity of the mode profiles (inset figures in FIG. 12) which varied as 10.5, 11.1, and 11.4 μm diameter (3-dB) for laser polarization (1) linear and parallel to scan direction, (b) circular, and (c) linear and perpendicular to scan direction, respectively. Further, the latter case also produced birefringent waveguides as noted by the $\lambda_{TM}-\lambda_{TE}$=0.17 nm wavelength separation of the two sharp 0.1-nm Bragg lines.

These lines correspond to transverse magnetic (TM) and transverse electric (TE) polarization modes of the GW (confirmed by lens firing of linear polarized light into the waveguides) and are associated with a $\Delta n_B = n_{TM}-n_{TE} = (\lambda_{TM}-\lambda_{TE})/2\Lambda = 3.2\times 10^{-4}$ birefringence of the waveguide, where $n_{TM}$ and $n_{TE}$ are the effective refractive indices for TE and TM modes, $\lambda_{TM}$ and $\lambda_{TE}$ represent the Bragg wavelength for TM and TE modes, and $\Lambda$ is the grating period of 0.5356 μm. These polarization sensitive responses indicate a new method of manipulating laser polarization for controlling the strength and birefringence of GW devices during laser writing for introducing polarization depend optical devices and optical circuits.

The environmental stability and robustness of WG devices are important properties for numerous applications. Bragg GWs with single ~1560 nm resonances were formed using the above exposure conditions of 522 nm laser light, 75 mW average power, 60% AOM duty cycle, 0.2678 mm scan speed, and linearly polarized laser light parallel to the waveguide direction. The BGs were then characterized in repeating cycles of heating and cooling steps to note thermal degradation of Bragg grating strength and/or waveguiding properties. The GWs were exposed to 250° C. in a sequence of 1 hr, 1 hr, 2 hr, and 4 hr, for 8 accumulated hours, and then exposed to 1 hr at each of 500° C., 750° C., and 1000° C. temperature. Waveguide characterization was completed before the first heat cycle, and following each heating-cooling cycle.

Figure 13:
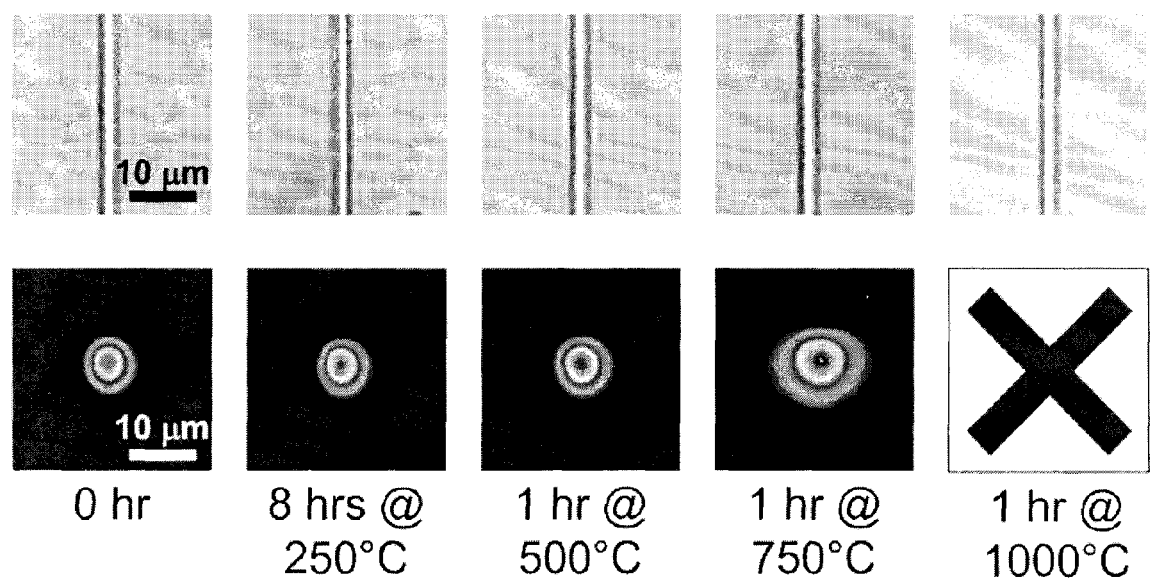
FIG. 13 illustrates the thermal stability of the GW devices with microscope images of waveguides (top row) at 40× magnification and guiding mode profiles at 1560 nm (bottom row) as a function of several thermal heating and cooling cycles.

FIG. 13 (top) illustrates the high temperature stability of the present GW devices with optical microscope images of waveguides (top row) recorded at 40× magnification. Grating waveguide were written with 60% duty cycle, 75 mW average power, and 0.2678 mm/s scan speed and characterized as written (0 hr), and following oven heating at 250° C. for 8 hours, and 1 hour each at 500° C., 750° C., and 1000° C. (figures left to right, respectively). There is little change apparent in the optical microscope images, with only a weak drop in contrast noted after the 1000° C. cycle. However, waveguide modes show degradation at 750° C., and guiding was no longer possible after the 1000° C. anneal.

There is little change apparent with increasing heat exposure (left to right) until a weak drop in waveguide contrast is noted after the 1000° C. cycle. Examination of the waveguide mode profiles (bottom row images) reveal more apparent degradation, beginning at 750° C. Here, the waveguide mode diameter of ~18 μm greatly exceeds the original 11 μm diameter (bottom left figure), indicating a decrease in the average effective refractive index of the waveguide. Guiding of 1560 nm was no longer possible after the 1000° C. thermal anneal step, suggesting strong erasure of the laser modification track.

Figure 14:
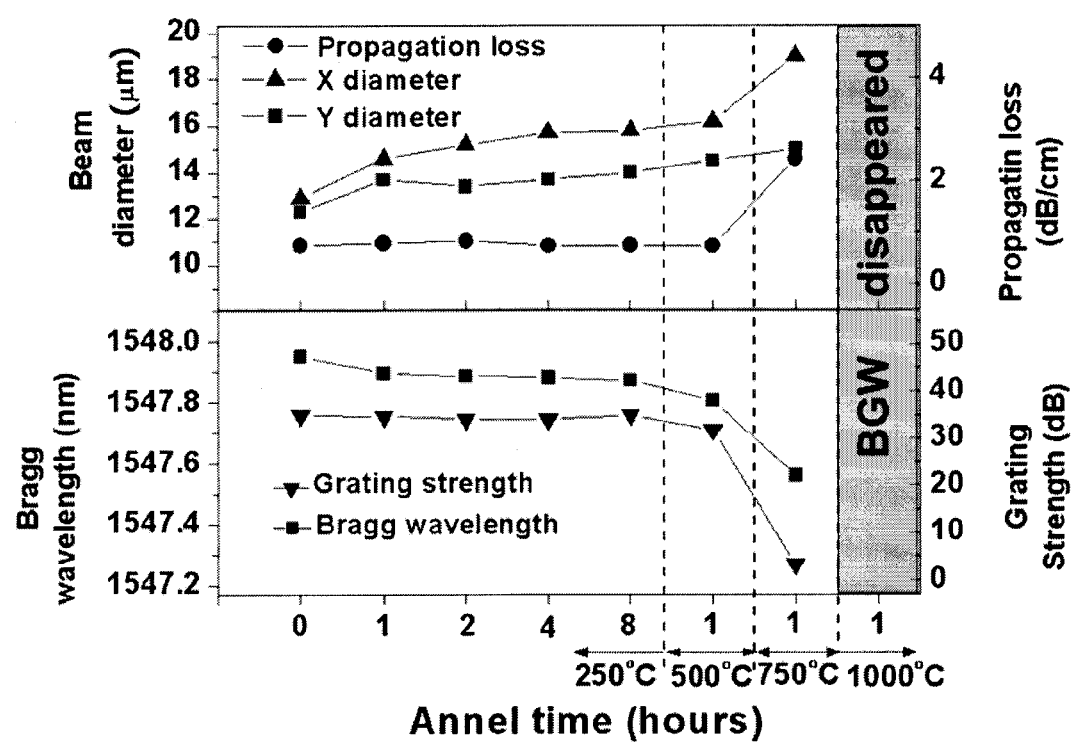
FIG. 14 illustrates the degradation of grating waveguide properties after several thermal annealing cycles beginning with 1, 2, 4 and 8 hour accumulated exposure at 250° C., and followed with 1-hr additional cycles for each of 500° C., 750° C., and 1000° C., with the top plot being the measured beam waist diameters ($1/e^2$ intensity) and waveguide propagation loss after each anneal cycle, and the bottom graph being the grating strength and Bragg wavelength dependence.

The high thermal stability of both the waveguide and the Bragg grating are illustrated in FIG. 14, for the same thermally annealed GWs of the previous paragraph. The top graph presents the beam waist diameters (1/e$^2$ intensity) measured after each anneal cycle in the vertical and horizontal orientations as presented in the bottom images of FIG. 13. Waveguide propagation loss is also plotted here, while the lower graph shows the measured grating strength and Bragg wavelength dependence also following each heat cycle. Within the accuracy of these measurements, this data shows there is little degradation of neither the GW guiding strength nor the Bragg grating strength until after the 750° C. treatment, which causes a more than an order of magnitude drop in grating strength, and 10% increase in the guiding mode size. Waveguiding (solid area in figure) was not observable near 1560 nm following the 1000° C. treatment.

On the other hand, the gratings remain stable at 250° C. for 8 hours, and degrade only slightly from 35 dB to 31 dB after 1 hour at 500° C. The Bragg wavelength change tracks similarly with the grating strength, indicating that both the AC and DC (effective) refractive index changes induced by the laser have similar high thermal stability for applications at elevated temperatures of up to at least 500° C. This thermal stability will vary with be the properties of the material as much as the laser processes used to define the GW devices therein.

Example 3

This example teaches the use of the $0^{th}$ order diffraction beam from the AOM to form GWs with periodic changes in power level. The embodiment of FIG. 2 is applied with the $0^{th}$ order diffraction beam of the AOM selected as in FIG. 3 to provide modulated pulse energy variable anywhere within a minimum of ~45% to a maximum of 100% total laser energy per pulse. For the present case, a square modulation envelope was selected, set to 45% minimum and 100% pulse energy.

FIG. 4 demonstrates two examples of a similar case of 50% and 100% modulation of pulse energy with external AOM triggering set to 80% and 50% duty cycles for top, middle, and bottom figures, respectively.

Figure 15:
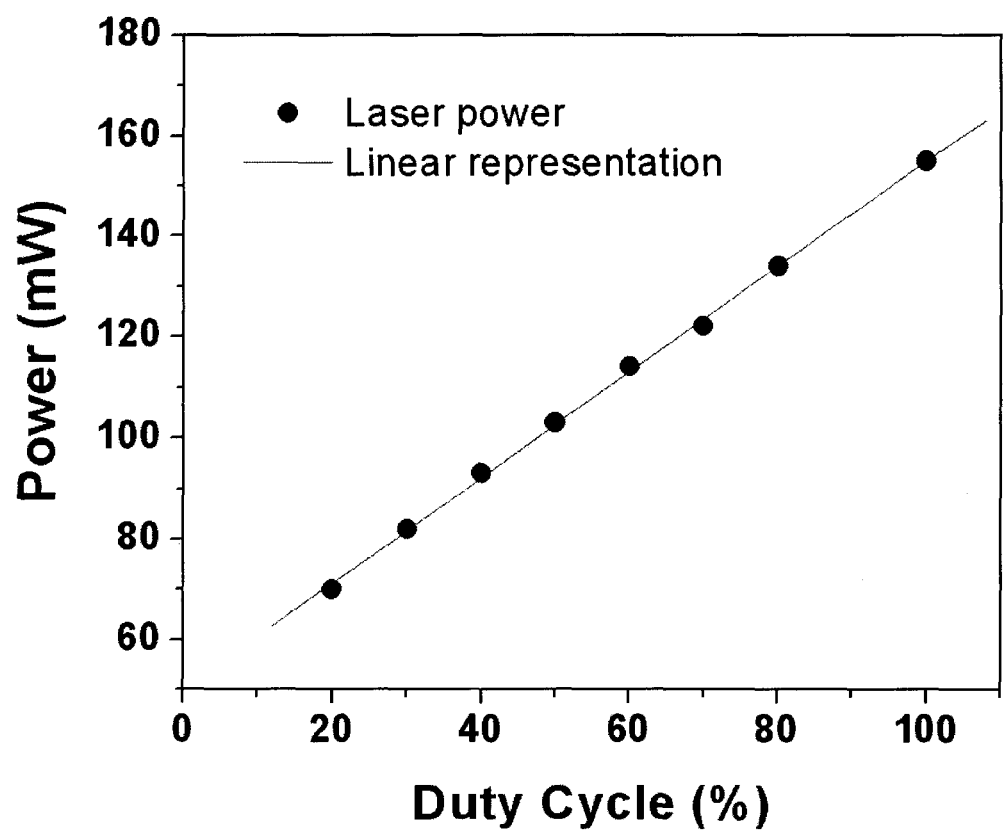
FIG. 15 illustrates the linear relationship (solid line) of average laser power (solid circles) at 500-kHz repetition rate in the $0^{th}$ order diffracted beam generated by the AOM with respect to the AOM duty cycle.

FIG. 15 illustrates the laser power measured in the $0^{th}$ order AOM diffraction beam as a function of AOM duty cycle. The solid line representation of the data demonstrates the linear control of laser power (or pulse energy or intensity), which intersects the vertical axis at ~55% maximum power, which is selected by controlling the $RF_{triggering}$ voltage driving the AOM.

The laser beam delivery and sample scan exposure conditions were similar to those used in Example 1. Fused silica glass was scanned transversely to the laser beam direction with scan speed of 0.535 mm/s and polarization oriented parallel to the sample scan direction. The laser repetition rate was 1 MHz and the AOM modulation rate was 1 kHz. After the laser writing, the glass sample was ground and polished at both facets, characterized by optical microscopy, and then probed with 1560 nm light to examine near-field intensity profile of guide modes, waveguide losses, and Bragg grating reflection and transmission strengths.

Figure 16:
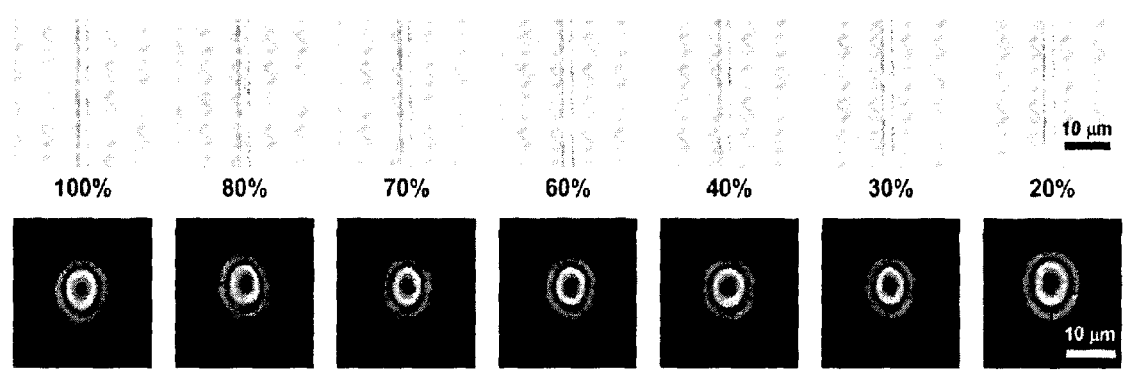
FIG. 16 illustrates the transverse microscope images (top row) and near-field mode profiles (bottom row) of grating waveguides formed in fused silica glass with 522 nm laser light at 150 mW average power, 400 fs pulse duration, 1 MHz repetition rate and 1 kHz modulation frequency (square wave) of AOM in $0^{th}$ order diffraction.

The top row of images in FIG. 16 show the back-light overhead microscope images of the grating waveguides produced at various AOM duty cycles decreasing from 100 to 20%, as labelled left to right. The sample was scanned at 0.535 mm/s speed transversely to the laser propagation direction. All waveguides appear to have identical width of ~2 µm, which slightly exceeds the laser spot size of ~1 µm in diameter. Segmentation of the waveguides is somewhat apparent along the waveguide length, with slightly improving contrast at lower duty cycle, which suggests the formation of more isolated refractive index voxels than in the case of higher duty cycle. However, such direct observation of the 0.5 µm period modulation of the GWs is obscured by ~1 µm optical resolution of the present microscope.

The bottom row images of FIG. 16 show the near-field mode profiles for 1560 nm light guided in the waveguides produced with the duty cycles as labelled above each figure. These mode profiles can be well approximated with Gaussian intensity distributions with slightly larger (~1.1 times) diameter on the vertical axis (the laser propagation direction).

Figure 17:
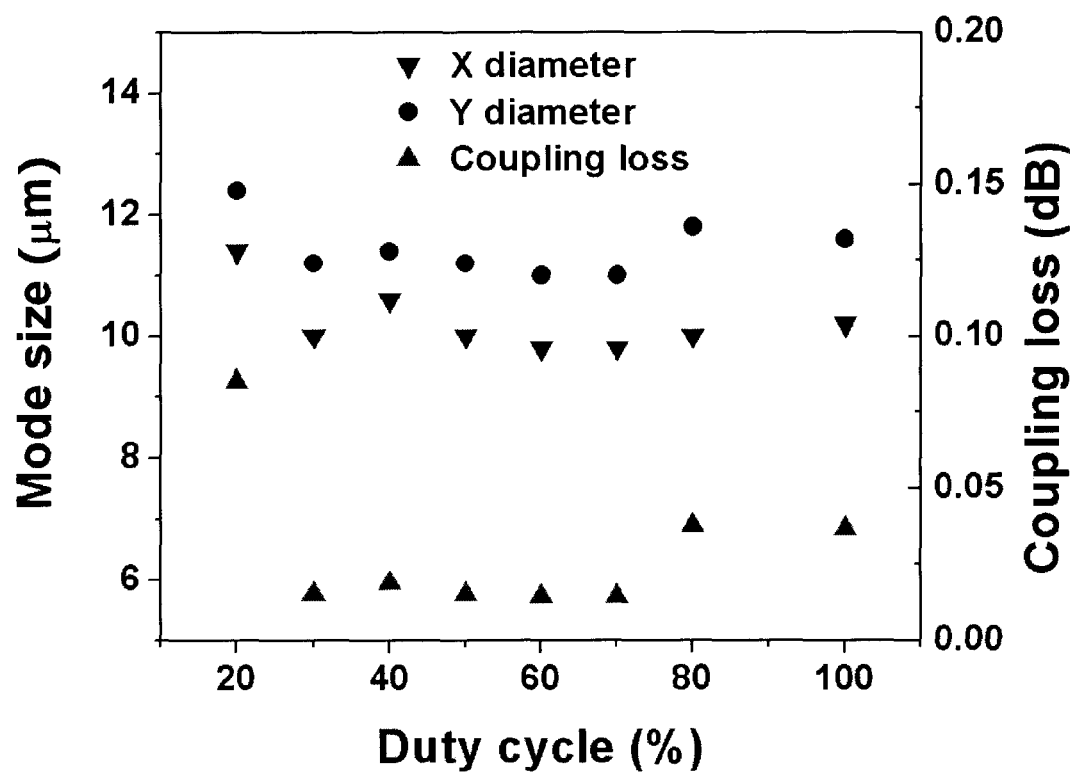
FIG. 17 illustrates the AOM duty-cycle dependence of waveguide mode diameter ($1/e^2$ intensity) measured in x and y directions and the theoretical coupling loss calculated for coupling to standard Telecom fiber (using index matching oil)

These observed mode diameter sizes and the calculated coupling loss to standard single-mode optical fiber inferred from the overlap integral method are presented in FIG. 17 as a function of the AOM duty cycle. The modes sizes of about 10 to 12 µm in diameter vary little with duty cycle, suggesting an attractive invariance in the waveguide overall guiding properties (i.e. effective or DC refractive index contrast) with average power exposure that varies here from 20 to 100%. This small mode variance together with the good match of mode diameter to typical mode sizes of 10.5 µm in standard optical fiber (Corning™ SMF28) indicates low coupling loss of less than 0.1 dB per facet over this 20-100% range in duty cycle.

Figure 18:
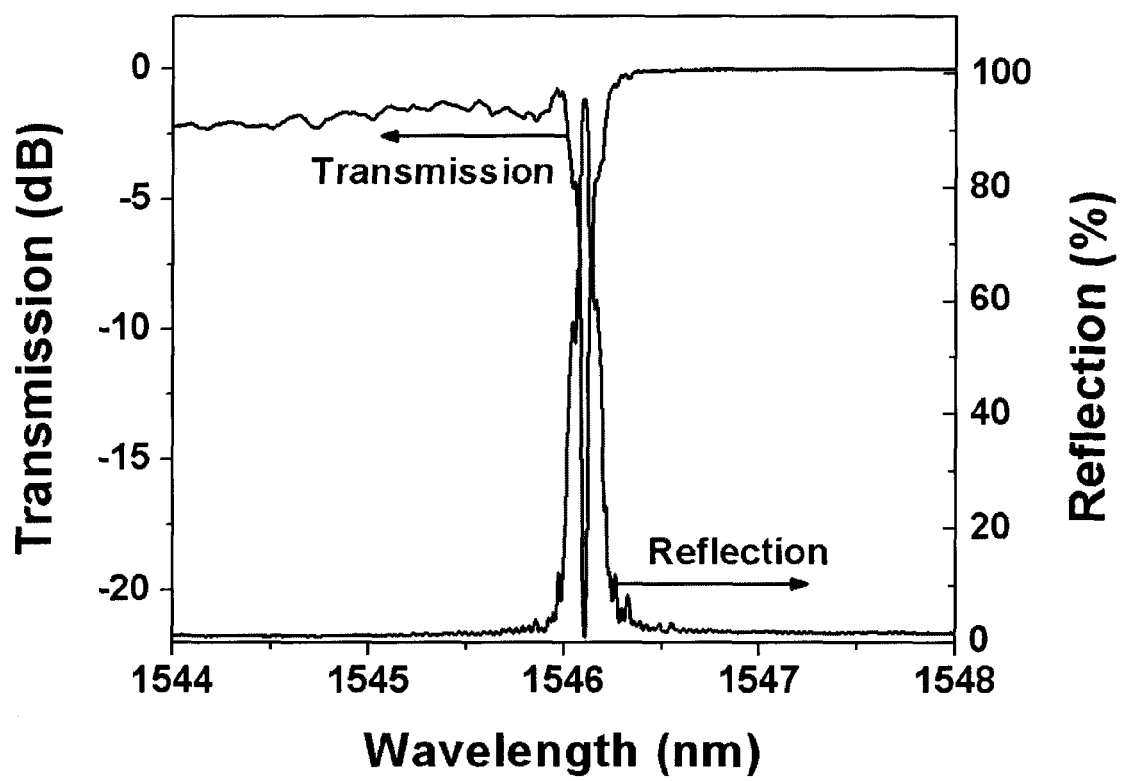
FIG. 18 illustrates the transmission and reflection spectra recorded in a grating waveguide written with 150 mW laser power modulated from 45% to 100% at 30% duty cycle.

The transmission and reflection spectral responses of the grating waveguide written with 30% duty cycle and 52 mW net laser power is shown in FIG. 18. The grating waveguide has a 22 dB transmission dip and ~95% reflection peak at 1546.1 nm, both defined in a narrow 0.2 nm bandwidth (3 dB). To the short-wavelength side of the main transmission peak, one finds a ~2 dB loss occurring over a broad wavelength range, arising from radiation mode loss due to the small voxel size relative to the mode diameter. An alternate laser focal spot to change the shape and size of the voxel can reduce this component of waveguide loss.

Figure 19:
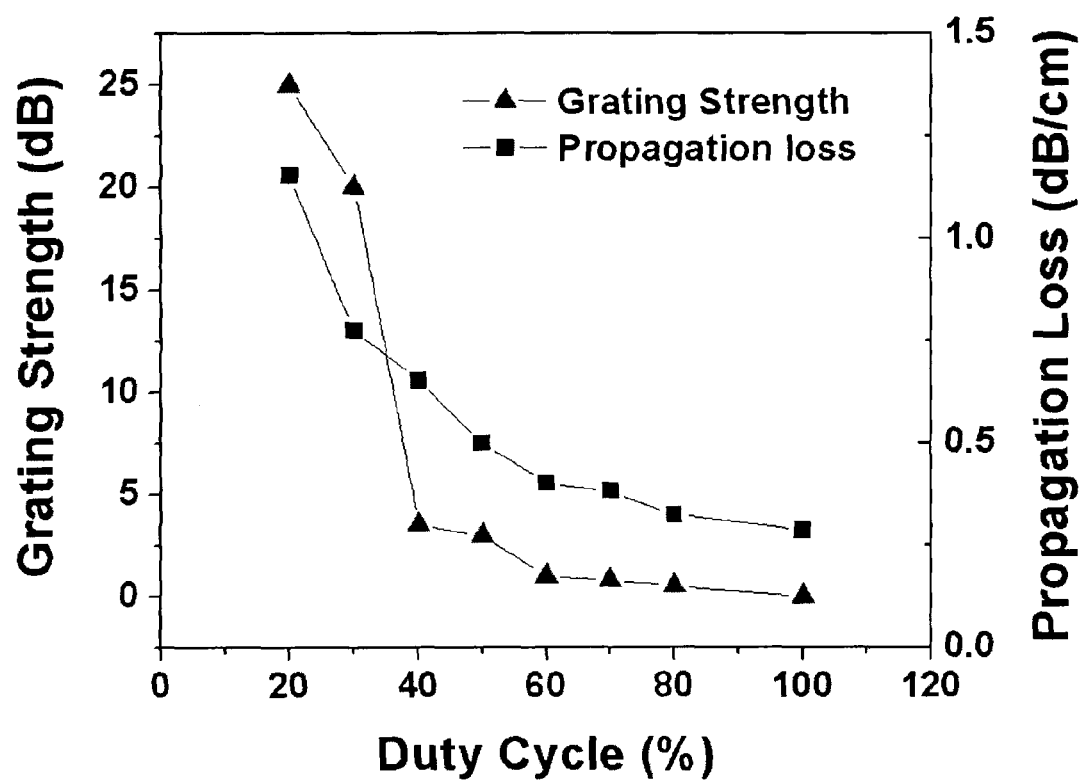
FIG. 19 illustrates the variation of Bragg grating transmission strength and waveguide propagation loss measured in GWs written with AOM modulation duty cycles varied from 20 to 100%.

FIG. 19 illustrates the dependence of the waveguide grating strength in transmission and waveguide propagation loss on the AOM duty cycle from 20 to 100%. Bragg grating strength and waveguide loss are illustrated to trade against each other, providing minimum losses of ~0.3 dB/cm when no grating is present at 100% duty cycle (no AOM modulation), and increasing strongly to 25 dB grating strength and 1.15 dB/cm loss at the high modulation provided by 20% duty cycle. The waveguide propagation loss increases here due to stronger scattering from more isolated refractive index voxels. Duty cycles of greater than 50% are favored in providing modest propagation losses below 0.5 dB/cm, but at the cost of weak, less than 7 dB, transmission resonances. Such grating strength is nevertheless suitable for many sensing applications, but most optical filtering applications will require 30% to 20% duty cycle to provide stronger gratings of 21 to 25 dB, respectively. The 30% duty cycle is an attractive option to provide moderately strong 21 dB grating strength with 95% reflection, and a moderate propagation loss of ~0.8 dB/cm.

Figure 20:
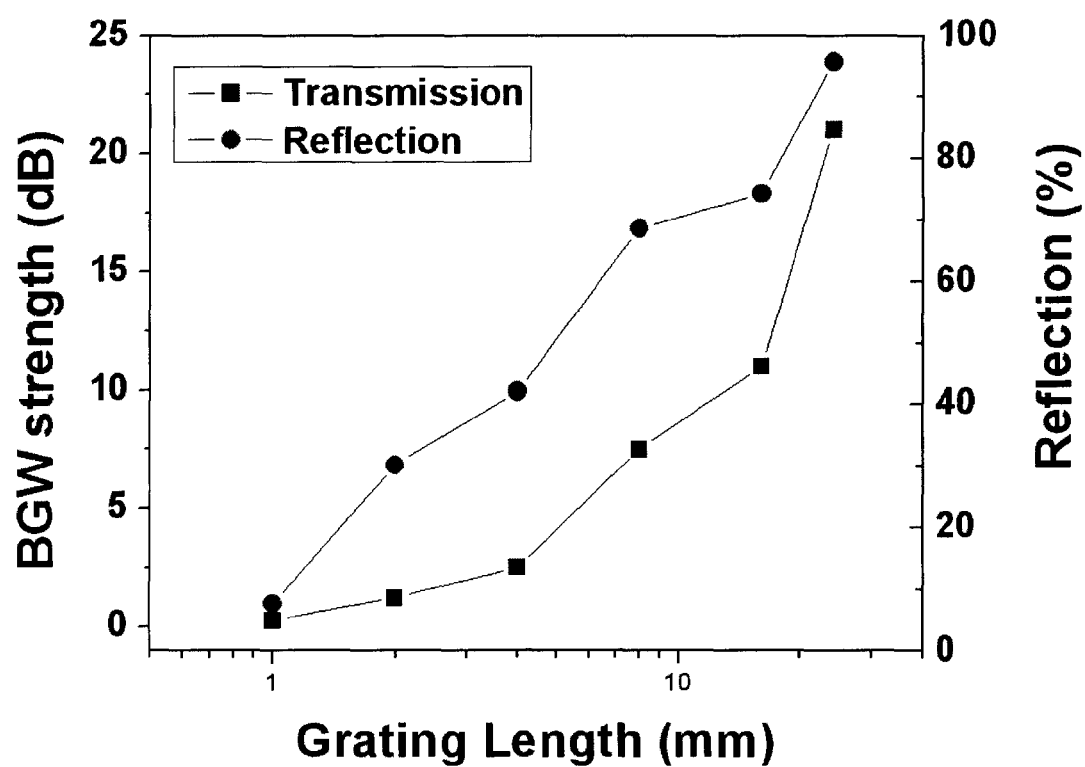
FIG. 20 illustrates the dependence of the peak Bragg grating strength measured in transmission and reflection as a function of Bragg grating length of 1 to 25 mm.

The length of grating waveguide formed by the laser is another control method for increasing grating strength. FIG. 20 shows the measured transmission strength in dB and the reflection peak in percent as a function grating waveguide length for a 30% AOM duty cycle. Both transmission and reflection peaks increase monotonically with length as expected. However, this increase in Bragg grating strength trades against increasing waveguide scattering loss that yields an exponentially decreasing power transmission with increased length.

Example 4

Figure 21:
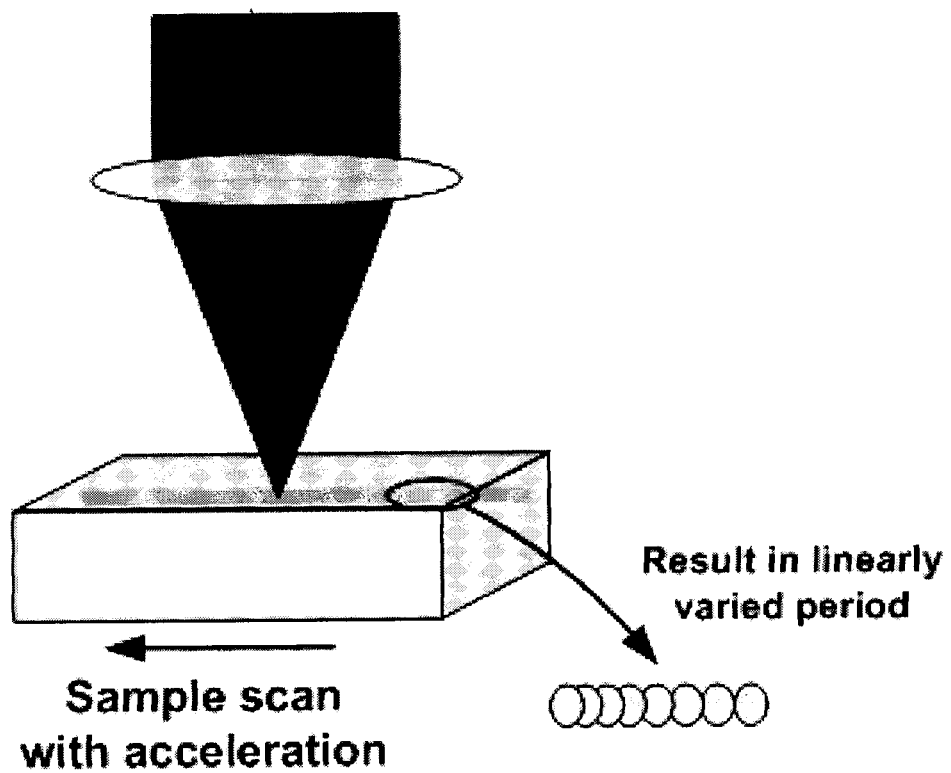
FIG. 21 shows a method for fabricating chirped fiber gratings by applying a constant acceleration to the sample during modulated laser exposure to generate linearly varied voxel separations along the waveguide.

The period of the GWs can be easily adjusted, for example, by changing the sample scan speed. This example teaches the method of applying acceleration in the sample motion stages to create aperiodic gratings with linear or higher order frequency chirp in the GW spectral response. In this example, a linearly chirped GW is demonstrated by varying the laser scan speed linearly during the fabrication process, as illustrated in FIG. 21.

The chirped BGWs were fabricated inside a 25-mm long fused silica glass block, by using the same writing technique as described in Example 1. Laser parameters and focusing conditions were also the same as in Example 1, with the AOM set at 60% duty cycle and 500 Hz frequency. The sample was scanned with the average velocity v=0.2678 mm/s targeting center Bragg wavelength at ~1550 nm. According to the Bragg condition $\lambda_B=2n_{eff}\Lambda=2n_{eff}v/f$, the sample scan acceleration was selected as 0.371164, 1.85582, 3.71164, 9.2791, 18.5582, and 37.1164 ns/s², targeting BGW bandwidths (Δλ) of 0.2, 1, 2, 5, 10, and 20 nm, respectively.

Figure 22:
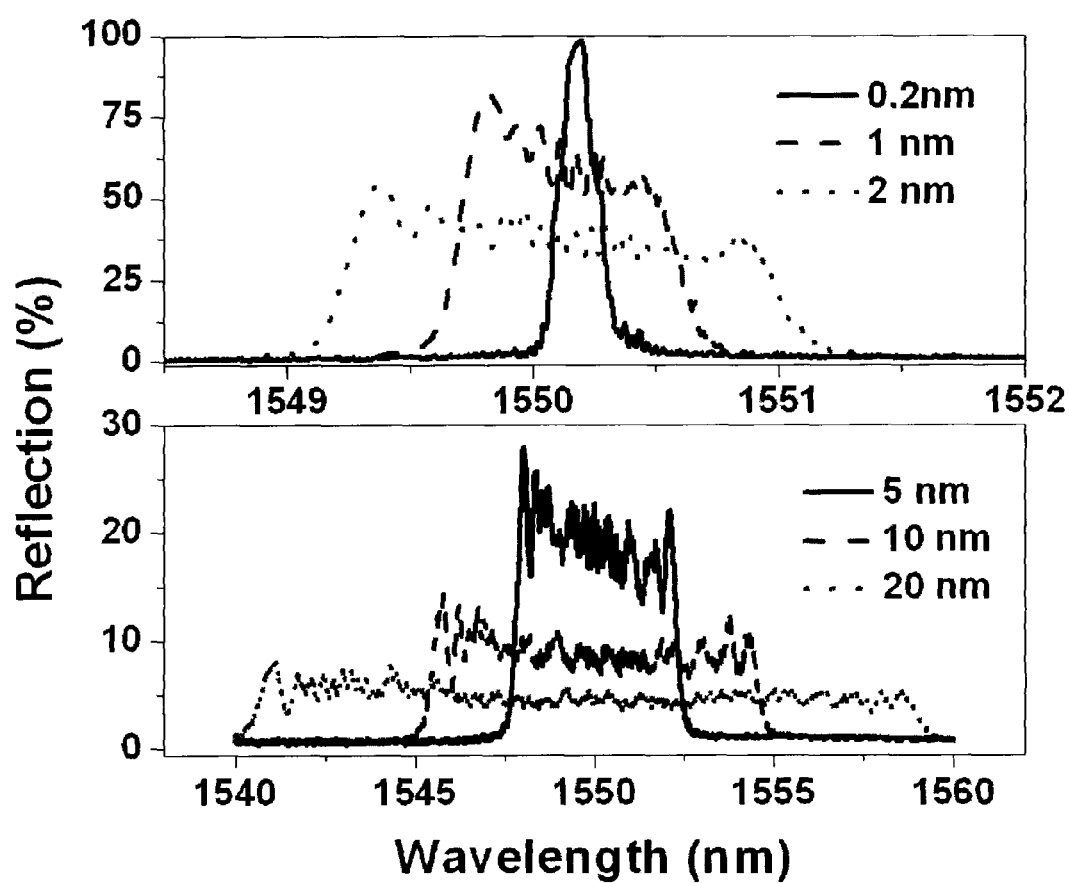
FIG. 22 illustrates the reflection spectra of several chirped GWs labelled with their design bandwidth.

FIG. 22 illustrates the measured reflection spectra of the laser-written chirped BGWs with designed bandwidth from 0.2 nm to 20 nm. The observed bandwidths are close to the designed values with a maximum 14% deviation for the case of 1-nm chirped BGW. Although flat-top reflection spectra were expected, the observations in FIG. 22 show oscillations and graded side slopes that likely arise from non-uniform acceleration of the target motion stages. The stronger reflection at the short wavelength side of the Bragg resonance is expected due to higher laser exposure at slower writing speed that increases the refractive index contrast in this portion of the BGW. Such effects can be mitigated by various means such as synchronously reducing the laser power or AOM duty cycle during the slower scan portion of the exposure.

Figure 23:
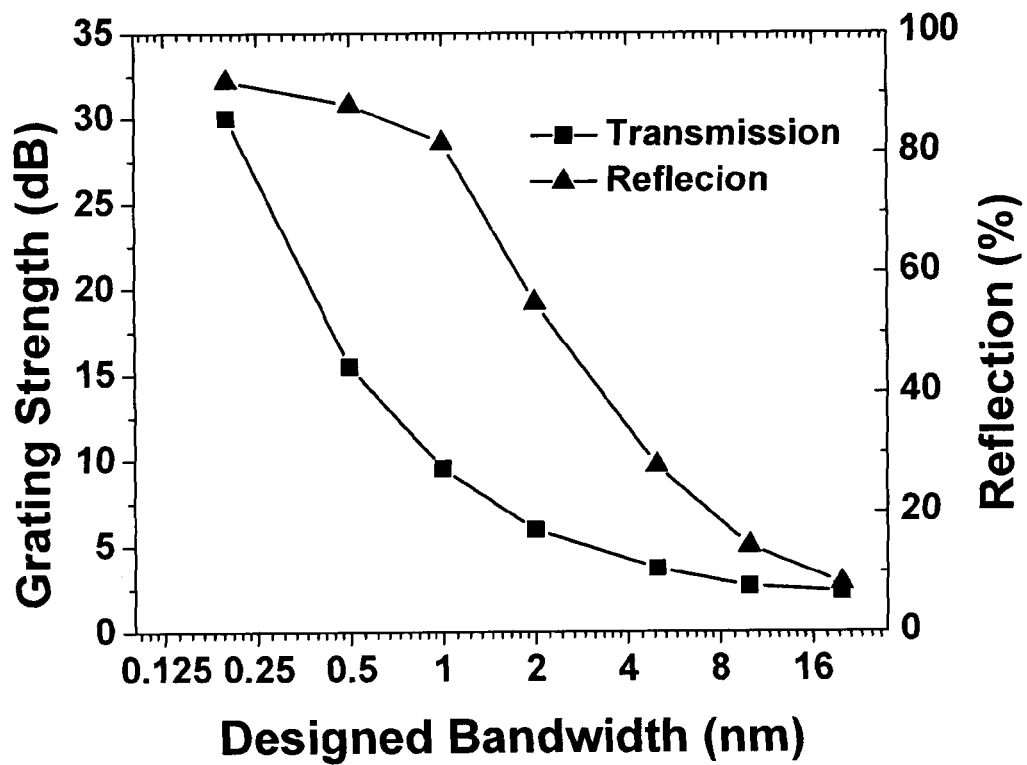
FIG. 23 shows the peak transmission strength and reflection of the chirped GWs of FIG. 22, plotted against the design bandwidth.

The peak reflection and transmission strength of the chirped GWs presented in FIG. 22 are plotted in FIG. 23. Because all the chirped BGWs have the same length (25 mm), the effective grating length per unit bandwidth decreases with increasing bandwidth (0.2 to 20 nm), causing a decrease of the peak reflection from 95% to 8% and a similar drop of grating transmission strength from 30 dB to 2 dB.

Figure 24:
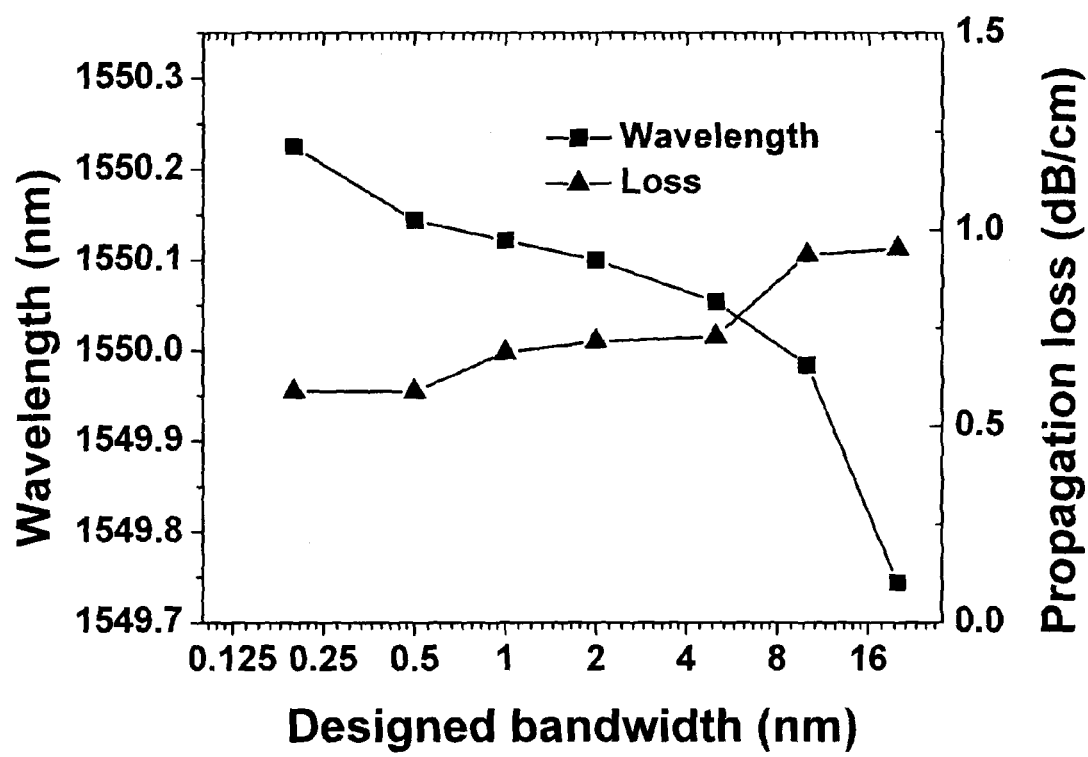
FIG. 24 illustrates the center Bragg wavelength and off-resonance waveguide propagation loss at 1560 nm of the chirped GWs of FIG. 22, plotted against the design bandwidth.

FIG. 24 shows the GW center wavelength has decreased as the bandwidth increased, caused by lower net exposure introduced by higher average velocity after longer periods of acceleration. This effect can be mitigated by various means such as synchronously increasing the laser power or AOM duty cycle during the faster scanning portion of the exposure.

FIG. 24 also plots the waveguide propagation loss as a function of the GW chirp bandwidth. The losses increased from 0.5 dB/cm at 0.2-nm bandwidth to 0.95 dB/cm for 20-nm bandwidth. More optical scattering from increased waveguide roughness or discontinuities for larger acceleration values is the possible cause of this increased loss. Such affects can be mitigated by smoother acceleration performance of the stages, or using other modulation techniques such as varying the period of the AOM which scanning the sample at constant velocity.

Example 5

Example 5 teaches an application of GWs in 3-D optical sensing. Bragg gratings, typically used in fibers, have broad applications in sensing of various physical quantities such as temperature, strain, pressure, and acceleration, due to the high sensitivity of the Bragg wavelength to small changes in the physical environment. This example extends these principles to GW devices, and further demonstrates optical sensing in three dimensional bulk optical material.

The Bragg wavelength of a GW satisfies the relationship $\lambda_B = 2n_{eff}\Lambda$. Since the effective index of the waveguide core, $n_{eff}$, and the periodicity of the grating $\Lambda$ are both affected by changes in strain and temperature, the Bragg wavelength of a GW is acutely sensitive to environmental variables that change the temperature and strain of the substrate. Taking the derivative of both sides this Bragg relation, the shift in the Bragg grating center wavelength, $\Delta\lambda_B$ due to strain and temperature changes is expected to follow similar responses as in fiber Bragg gratings, given by $$\Delta\lambda_B = 2\left(\Lambda\frac{\partial n}{\partial l} + n\frac{\partial \Lambda}{\partial l}\right)\Delta l + 2\left(\Lambda\frac{\partial n}{\partial T} + n\frac{\partial \Lambda}{\partial T}\right)\Delta T,$$

where Λ, n, l, and T are the grating period, waveguide effective refractive index, the grating length, and the grating temperature, respectively.

This wavelength shift separates into two parts.

The first part represents the strain effect on the Bragg resonance, which corresponds to a change in the grating spacing and refractive index induced by the strain-optic effect. As in fiber Bragg gratings, the we express the strain response of GW devices as $\Delta\lambda_B = \lambda_B(1-p_e)\in_z$, where $\in_z$ is the strain defined by $\in_z = \Delta l/l$ and $p_e$ is defined as $$p_e = \frac{n^2}{2}[p_{12} - v(p_{11} + p_{12})],$$

in which $p_{11}$, $p_{12}$ are components of the strain-optic tensor, n is the waveguide core index, and v is the Poisson's ratio. For fused silica, Borrelli and coworkers tested these parameters with ultrasonic methods, in N. F. Borrelli, and R. A. Miller, "Determination of Individual Strain-Optic Coefficients of Glass by an Ultrasonic Technique," Applied Optics 7, 745-& (1968), and reported $p_{11}$=0.126, $p_{12}$=0.26, and v=0.168, $p_e$=0.204. Using these values and n=1.445 as the effective index of the waveguide core, the strain-induced Bragg resonance shift near the telecom wavelength of 1550 nm can then be estimated as $\Delta\lambda_B/\in_z \approx 1.23$ pm/µ$\in$ for the GW devices.

The second part represents the temperature effect on the Bragg resonance shift of a grating that arises from thermal expansion increase in grating spacing and temperature increase in refractive index. The fractional wavelength shift $\Delta\lambda_B$ caused by temperature change ΔT can be written as $\Delta\lambda_B = \lambda_B(\alpha+\zeta)\Delta T$, where $\alpha=0.55\times10^{-6}$ is the thermal expansion coefficient for fused silica and ζ is the thermo-optic coefficient of the waveguide core. For a single-mode fiber, ζ is measured to be $8.6\times10^{-6}$, reported in A. Othonos, "Fiber Bragg gratings," Review of Scientific Instruments 68, 4309 (1997), leading to an expected $\Delta\lambda_B/\Delta T$=13.7 pm/° C. response at 1550-nm telecom band for a fiber Bragg grating.

The high-strength GW presented in FIG. 8 was uniformly heated on a hotplate to various temperatures from 25° C. to 125° C. The measured Bragg wavelength of the GW at various temperatures is plotted in FIG. 25. A fit to the data (solid line) showed good linear dependence of the Bragg wavelength with respect to the waveguide temperature. The linear representation of the data (slope of line in graph) yields a thermal optic response of 10.4 pm/° C. for the GW device, that is 24% less than the 13.7 pm/° C. value for the standard SMF28 fiber. The thermo-optic coefficient for the GW is $\zeta=6.16\times10^{-6}$ compared with $\zeta=8.6\times10^{-6}$ for standard telcom optical fiber. This close correspondence is expected since such fiber consists mostly of fused silica. Other values of thermo-optic responses are expected for different materials or composites of different materials.

Figure 26:
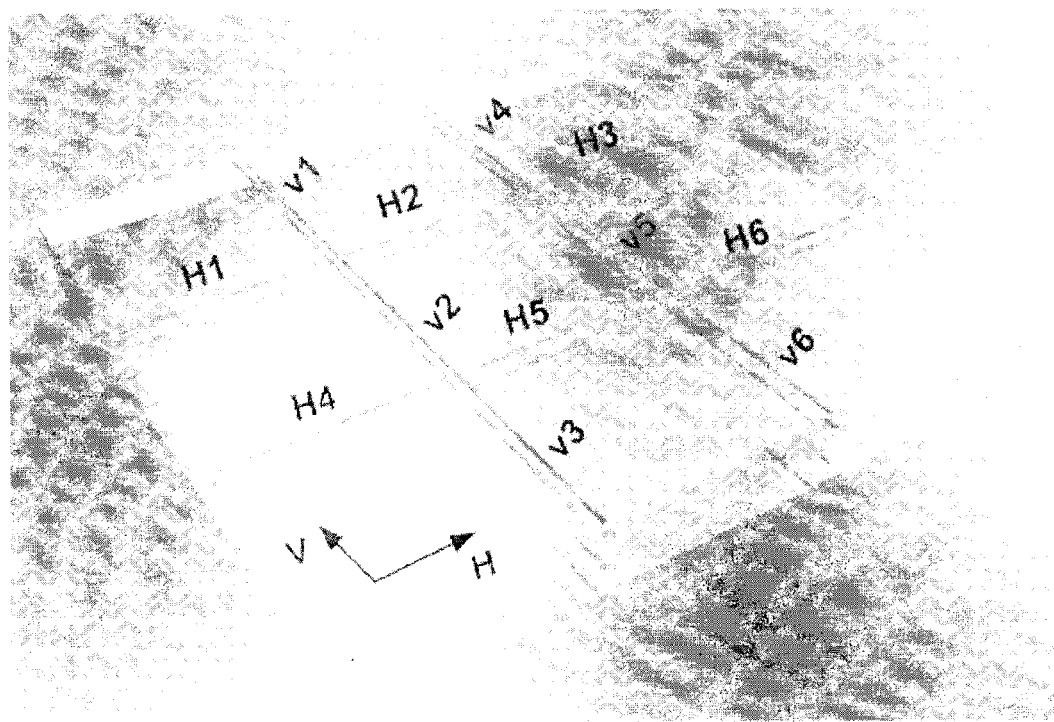
FIG. 26 depicts a schematic of a 3-D sensor network comprising two layers of multiple GW segments, each segment of 16.7 mm length being labelled uniquely, and providing a different Bragg resonance.

A 3D sensor network was written with laser parameters and focusing conditions identical to that used in Example 1. The AOM was set to 60% duty cycle and 500 Hz frequency. GW devices were written in a fused silica sample of 50 mm×50 mm×1 mm in size in the arrangement shown in FIG. 26. Two rows and two columns of distributed GWs, were written 75-µm under the glass surface, separating the sample into 9 equally divided squares. An identical network was fabricated on the backside of the glass also 75-μm beneath the glass surface. For each row or column, three 16.7-mm long BGWs with different Bragg resonances were cascaded in series by changing the GW writing speed during the scan process two times. The GW segments are labeled in the figure. On the top surface, the segments on the horizontal axis are named H1 through H6, and GWs in the vertical columns are named V1 through V6, as illustrated in FIG. 26. The corresponding BGW segments on the bottom surface are named H1B to H6B, and V1B to V6B, respectively (B for back surface), but are not labeled in the figure.

The designed Bragg resonant wavelengths of the various segments are $\lambda_B$=1530.0 nm for GW segments H1, H1B, H4, H4B, V1, V1B, V4, and V4B, $\lambda_B$=1540.0 nm for GW segments H2, H2B, H5, H5B, V2, V2B, V5, and V5B, and $\lambda_B$=1550.0 nm for GW segments H3, H3B, H6, H6B, V3, V3B, V6, and V6B. The GWs in the same row or same column have three different wavelengths, so that local change of physical parameters can be interpreted by monitoring the shift of each of the three Bragg resonances from one measured spectrum. By this means, it is possible to recognize the physical changes locally in each of the 18 sections separated by the BGW segments near the top and bottom surfaces of the glass sample.

Figure 27:
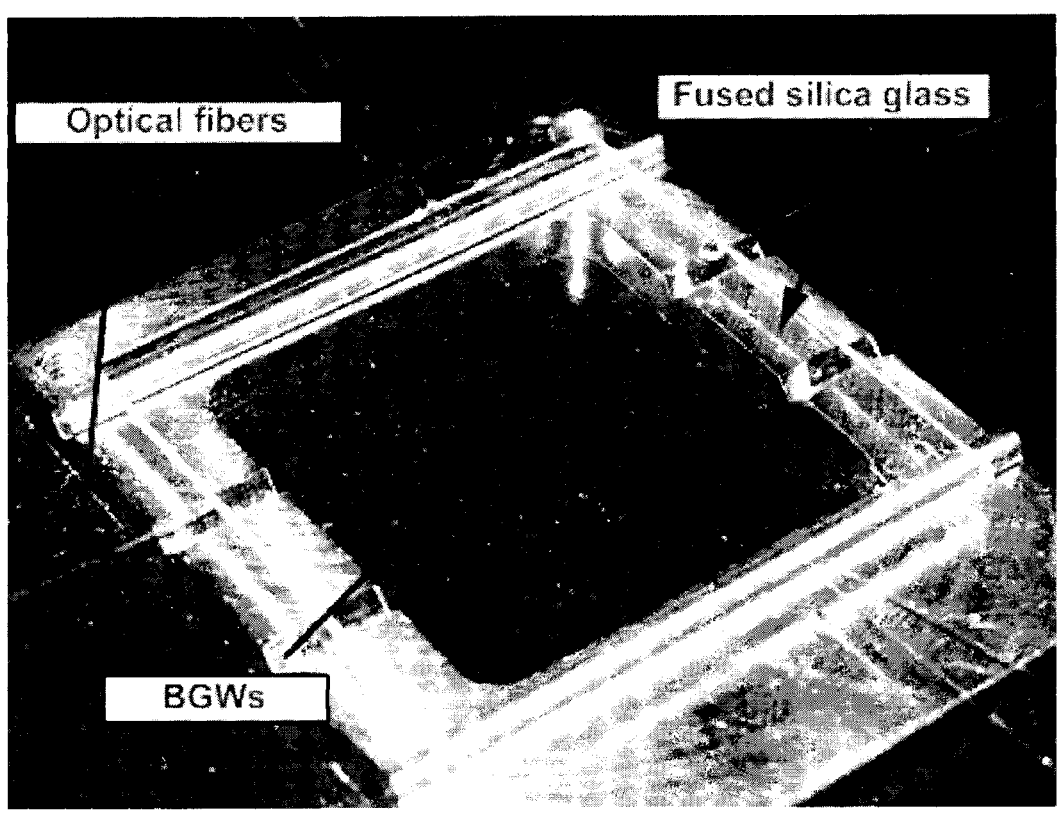
FIG. 27 shows a photograph of the 3-D GW sensor network device fabricated inside fused silica glass with the present burst writing method having the GW layout depicted in FIG. 26.

After GW fabrication, the sample was polished on all the four edge facets, butt-coupled with standard SMF28 fibers and bonded with UV curing polymers. FIG. 27 is a photograph of this device mounted on a sample holder, with fibers attached to the BGWs V4, V4B, and H1.

Figure 28:
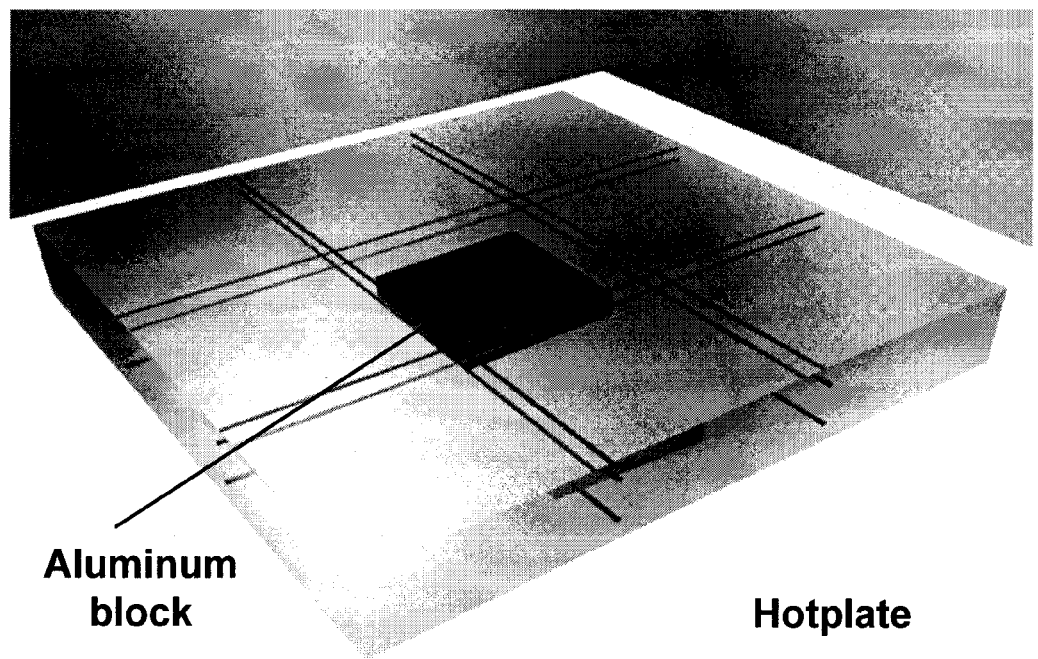
FIG. 28 shows a schematic of an experimental arrangement comprising a 3-D G2 sensor network and small contact heater against the bottom surface to generate a non-uniform heated temperature distribution throughout the 3-D GW sensor network.

A temperature gradient was generated by heating the centre of the bottom surface of the glass sensor network as depicted in FIG. 28. An aluminum block of smaller size (10 mm×10 mm×5 mm) than the sample size was mounted on the surface of the hotplate and the 3D sensor was then mounted on top of the aluminum block in the center.

The temperature of the hotplate, $T_1$, was varied from 25° C. to 125° C. in 25-° C. steps and the peak Bragg wavelength of the GW segments H1, H2, and H3 were measured for each temperature. The Bragg shift relative to the room temperature Bragg wavelength is plotted in FIG. 29.

Figure 25:
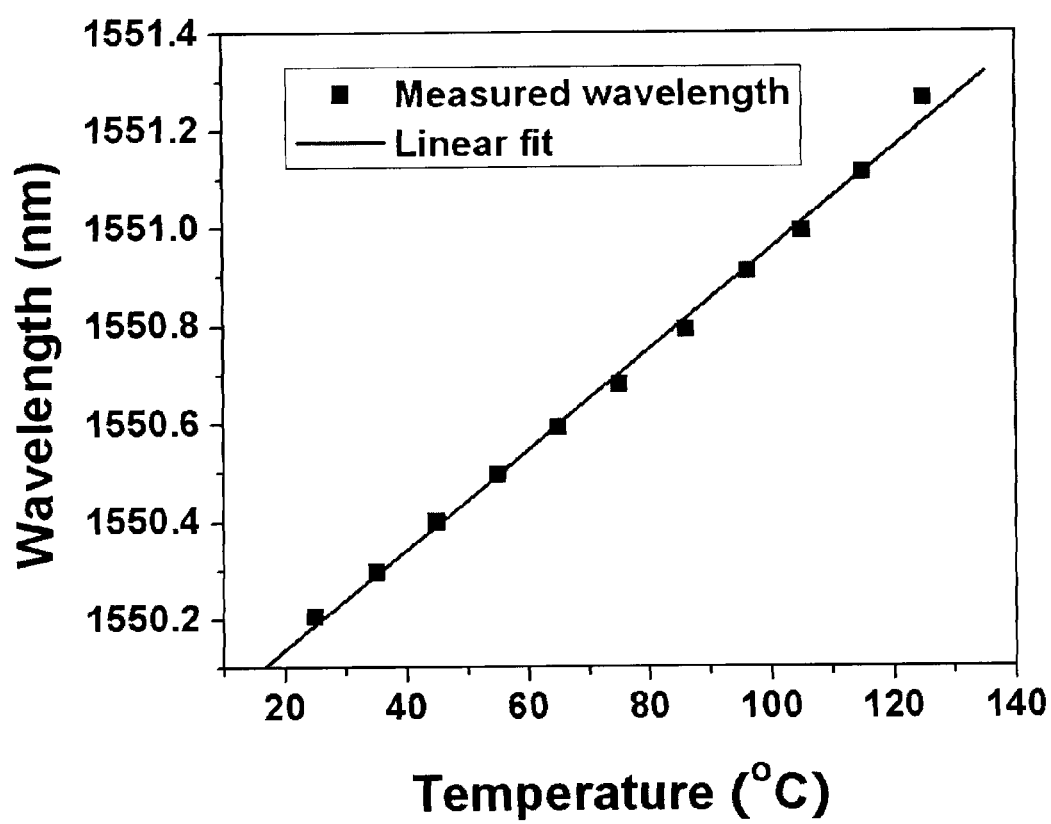
FIG. 25 demonstrates the linear response of the resonance Bragg wavelength of the GWs with respect to increasing sample temperature.
Figure 29:
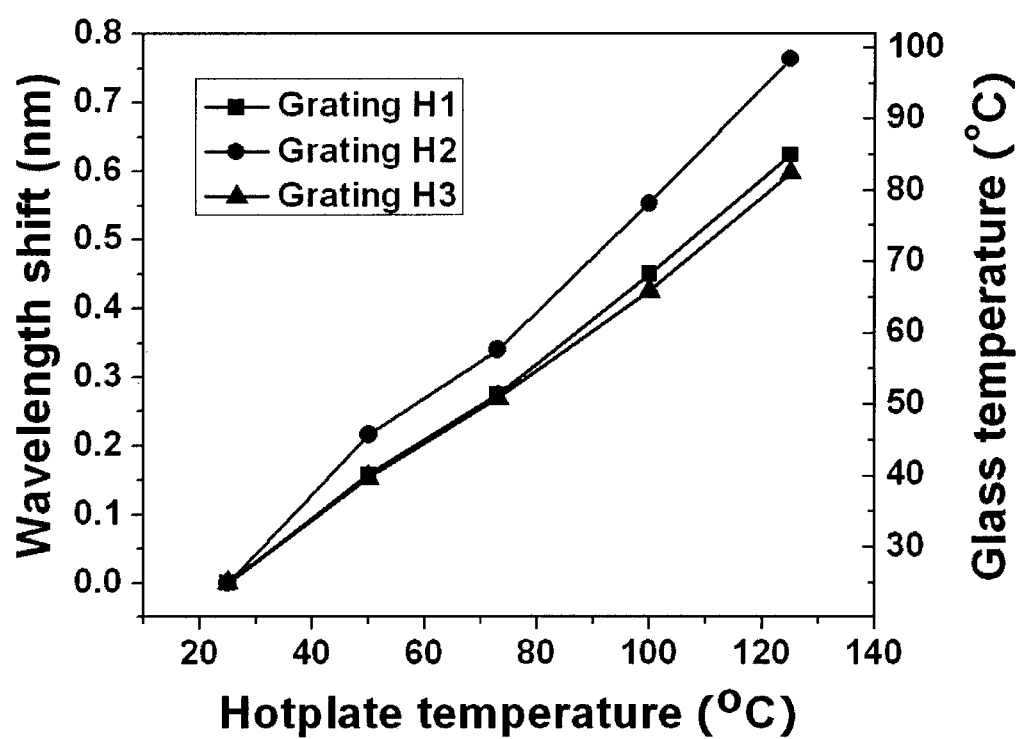
FIG. 29 plots the observed Bragg wavelength shift and the corresponding temperature of the BGW segment H1, H2, and H3, in one waveguide arm near the top surface of the 3-D sensor network, for hotplate temperatures between 25° C. and 125° C.

The measured wavelength shifts were converted to temperature changes using the 10.4 pm/° C. thermal response obtained in FIG. 25 to provide the temperature scale on the right side axis of FIG. 29. It is clear that due to the expected temperature gradient, the temperature at the center sensor H2 is higher than that of the peripheral sensors H1 and H3.

Figure 30:
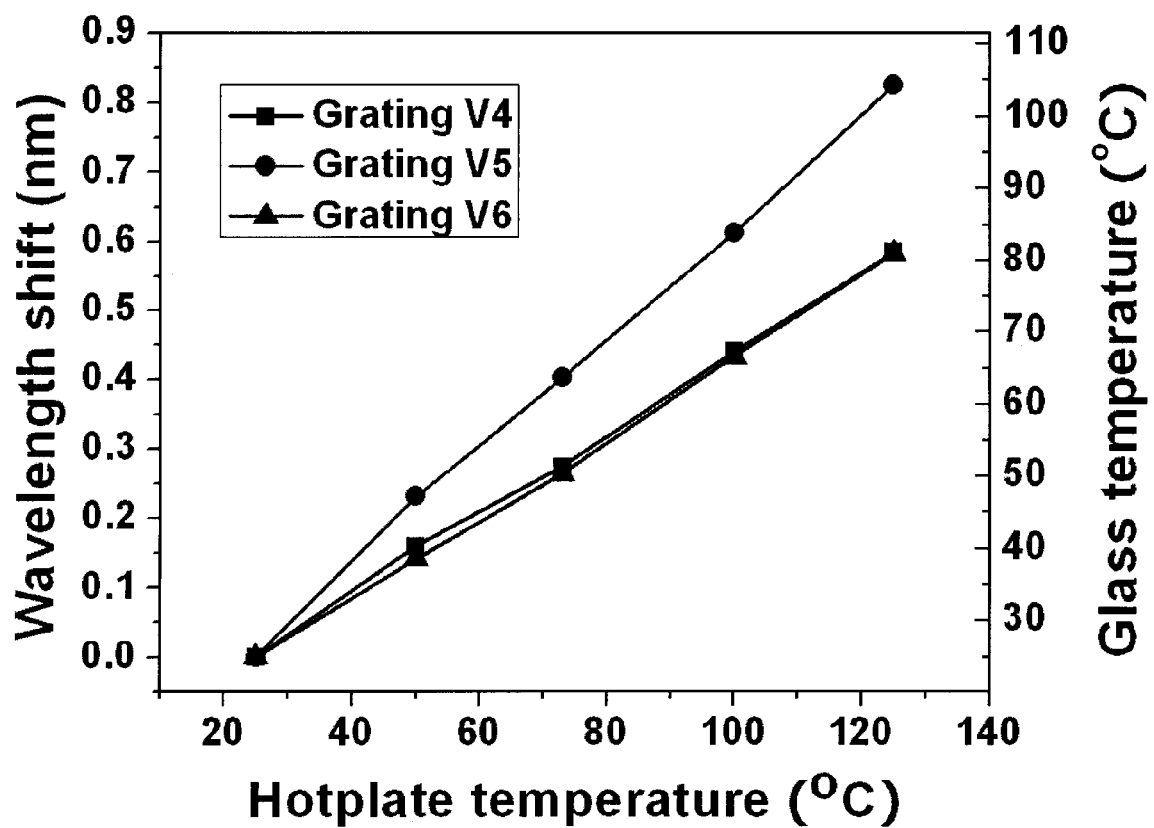
FIG. 30 illustrates the observed wavelength shift and the corresponding temperature of the GW segment V4, V5, and V6, in one waveguide arm near the top surface of the 3-D GW sensor network, for hotplate temperatures between 25° C. and 125° C.

Similarly, the wavelength shifts and temperature changes of the vertical GW segments V4, V5, and V6 were obtained and are plotted in FIG. 30. A higher temperature in the center GW (V5) is seen as expected compared with the temperatures of the outer GWs (V4 and V6).

Figure 31:
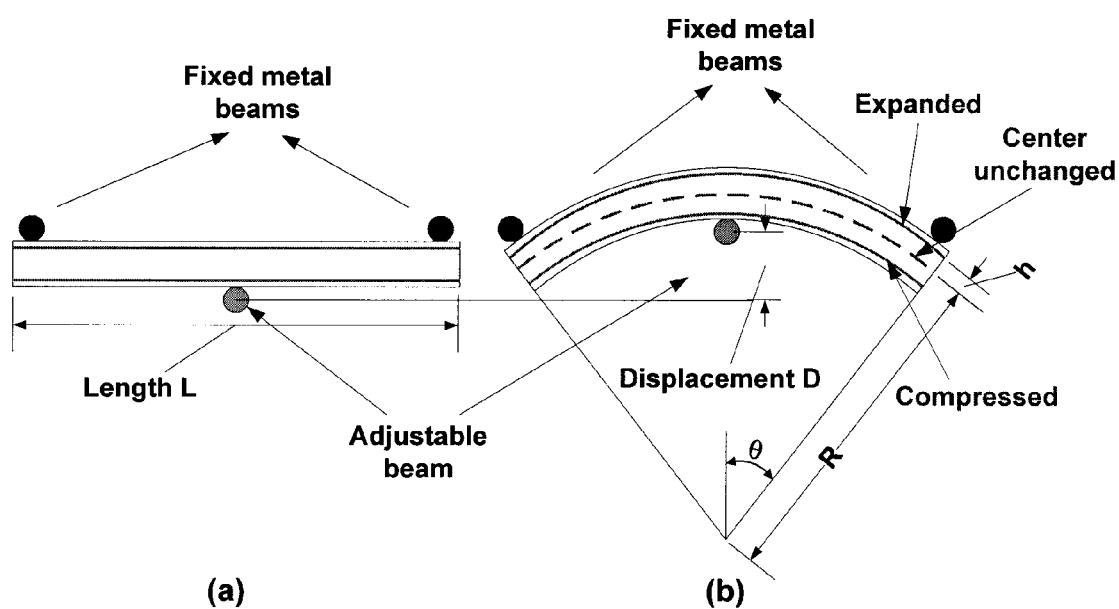
FIGS. 31(a) and 31(b) depict the 3-D GW sensor device of FIG. 27 in a beam bending arrangement with (a) no strain applied, and (b) with strain applied by pushing the bottom centre contact cylinder upwards by distance D against the sensor plate and two fixed cylinders, thereby curving the sensor plate to cause tensile and compressive strain in the respective top and bottom halves of the plate.

Combination of data in FIG. 30 and FIG. 31 correctly indicates a heat source in the center of the glass plate.

Temperature gradients along the GW devices manifested in increased Bragg grating bandwidth, Δλ, due to a non-uniform expansion of the grating period, thus defining a thermally chirped Bragg grating.

The 3D GW network was also applied to test strain induced inside the glass by bending the sample along both the "H" and "V" direction GW segments. Strong Bragg wavelength shifts were seen as expected only for strain induced parallel to a waveguide. Under bending, the symmetric positioning of GWs 75-μm from both top and bottom surfaces led to sampling of equal magnitudes of compressive and tensile strain. For identical GWs on the top and the bottom, this opposite strain shifted the Bragg wavelengths by identical magnitudes but in opposite directions of the spectrum. By acquiring the relative shift of the top and bottom BGWs, it is then possible to isolate bending from other physical changes of the sample such as temperature or parallel strains.

FIGS. 31($a$) and 31($b$) illustrates the experimental arrangement used for testing the bending response of the 3D GW sensor network. The sample was sandwiched between three parallel metal cylinders. The two beams on the top were fixed close to the edge of the glass block. The center cylinder on the bottom was moved vertically to contact the sample surface, as shown in FIG. 31($a$), and then displaced a further distance, D, the bend and curve the sample as illustrated in FIG. 31($b$). In this latter arrangement, there is no strain in the centre of the sample. However, the top GW devices undergo tensile strain and the bottom GWs undergo compressive strain.

The strain of the glass plate at the top and bottom waveguide, ∈, can be expressed as ∈=ΔL/L (considering only the linear strain), where L is the length of the glass sample and ΔL is the expansion of the glass, and has negative value for compression.

Assuming the curvature of the glass during deforming is uniform, then the bending radius R and the half angle θ satisfies L=2Rθ, which leads to ∈=ΔL/L=ΔR/R=h/R, where h is the distance of the waveguide to the glass center.

The displacement in the center of the glass, D, is related to the curvature radius by D=R−R cos B=2R sin²(θ/2), or simplified to D=2R(θ/2)²=Rθ²/2=L²/8R for the small curvature bending (θ close to zero) tested here.

Following the above development and conditions, the GWs should experience a strain of $$\varepsilon = \frac{h}{R} = \frac{8Dh}{L^2},$$

when bent with an uniform radius.

Figure 32:
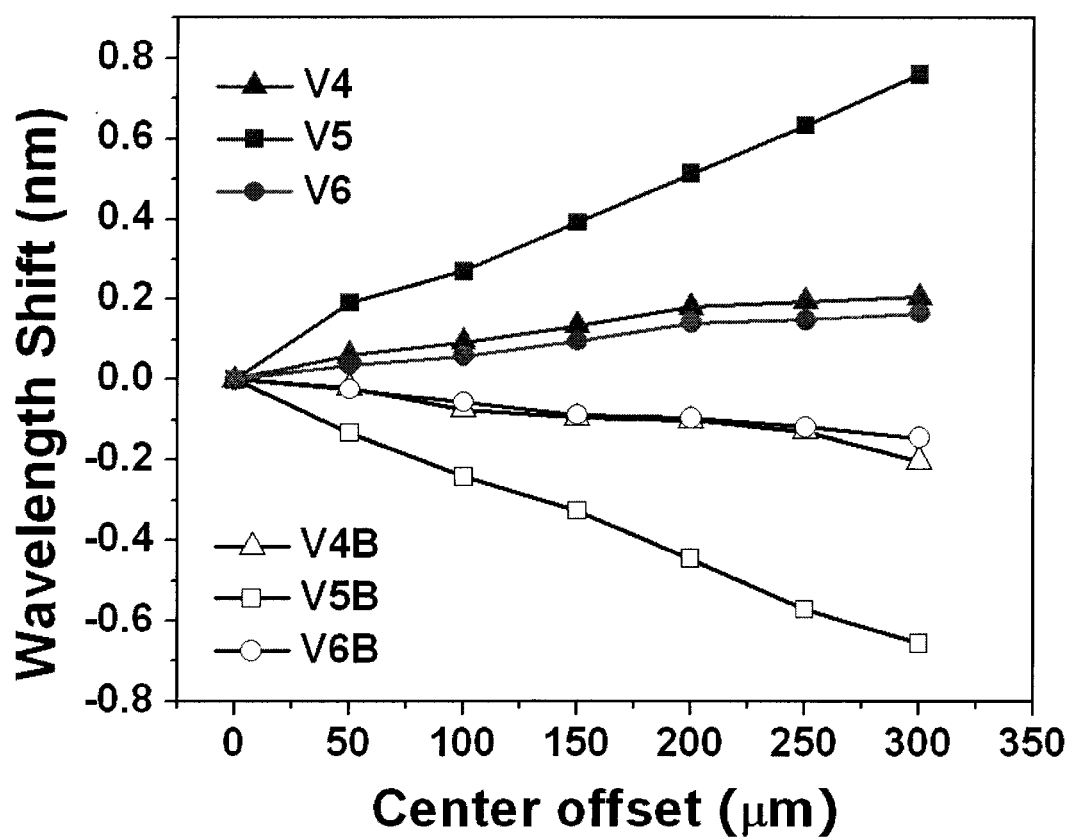
FIG. 32 illustrates the observed shift in Bragg wavelength of the GW segments V4, V5, V6 near the top surface, and V4B, V5B, and V6B, near the bottom surface with respect to the measured offset distance, D, of the center cylinder beam as defined in FIG. 32 for the 3-D sensor network under strain.

FIG. 32 plots the measured Bragg wavelength shifts with respect to the center beam offset, for BGW segments V4, V5, V6, V4B, V5B, and V6B. The GWs on the top and bottom of the glass sample have their Bragg resonances shifted symmetrically to longer and shorter wavelength, respectively, indicating tension on the glass top and compression on the glass bottom as expected.

FIG. 32 also shows that the Bragg wavelength shift from GW devices not in the centre of the glass block (V4, V6, V4B, V6B) was much smaller than the devices in the center (V5, V5B), which indicates less bending curvature on the outer edges of the sample. Further, non-uniform bending in this region presented broadened and frequency chirped Bragg responses for these devices.

Figure 33:
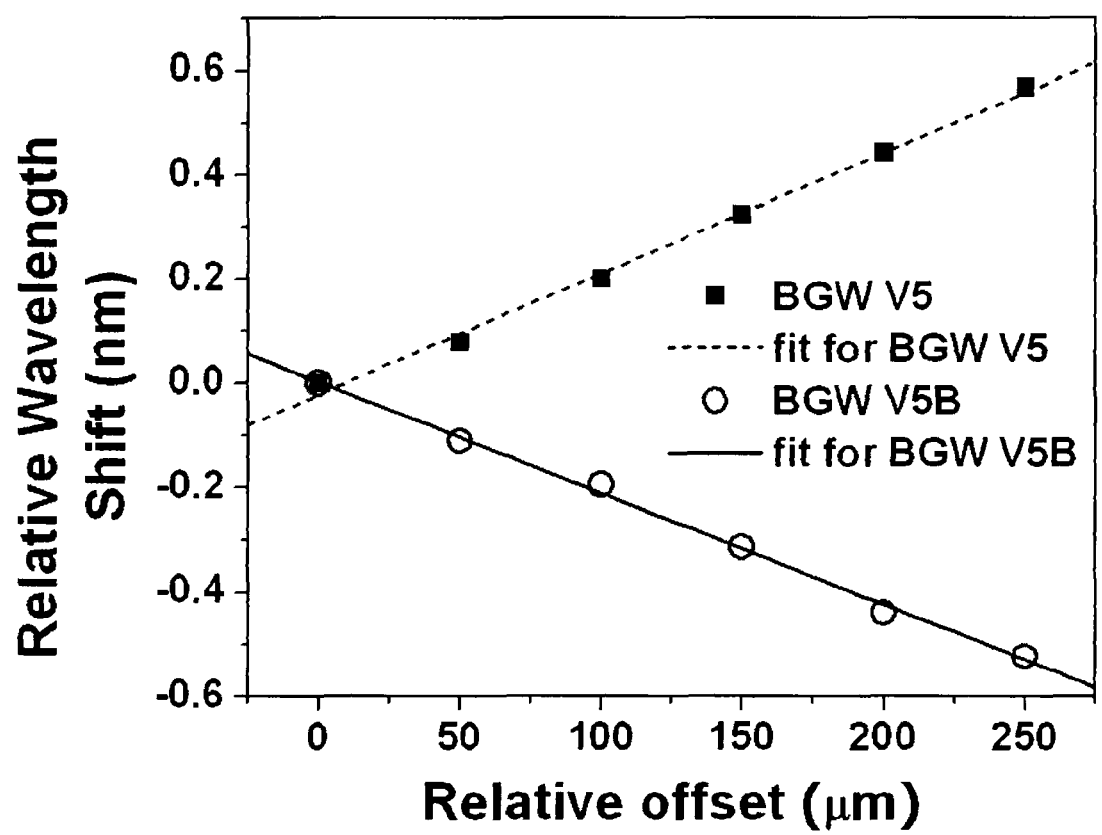
FIG. 33 plots the observed wavelength shift of the GW segments V5 (solid squares) and V5B (open circles) positioned symmetrically near the top and bottom surfaces, respectively, of the sensor together with a linear representation of the data (solid lines), with respect to the center cylinder offset distance, D.

To eliminate experimental error in first mechanical contact with the sample, the Bragg shift data for displacements of D=0 and 50 μm were eliminated for the center GWs, V5 and V5B, then re-plotted in FIG. 33 to extract the linear representation of the data (marked in dotted and solid lines), yielding slopes of s=2.32 pm/μm and −2.13 pm/μm for the GWs on top and bottom of the glass surfaces, respectively. This slope can be expressed as s=Δλ$_B$/ΔD, which combines with the previously derived equation, $$\varepsilon = \frac{h}{R} = \frac{8Dh}{L^2},$$

to yield the Bragg wavelength strain-optic response of $$\frac{\Delta \lambda_B}{\Delta \varepsilon} = \frac{sL^2}{8h}.$$

Values of 1.38 pm/µ∈ and −1.27 pm/µ∈ were inferred for V5 and V5B, respectively, showing good agreement with the predicted value of $\Delta \lambda_B/\Delta \in = 1.23$ pm/µ∈ discussed above. Further, these values are 20% and 10.4% different from the 1.15 pm/µ∈ reported for standard FBGs for 1550-nm radiation which is reported in "W. W. Morey, G. Meltz, and W. H. Glenn, "Bragg-grating temperature and strain sensors," in *Optical Fiber Sensors. Proceedings of the 6th International Conference. OFS '89* (Springer-Verlag, Paris, France, 1989), pp. 526-531." This close correspondence is expected since such fiber consists mostly of fused silica. Other values of strain-optic responses is expected for different materials or composites of different materials.

Example 6

According to another aspect, the substrate may be a composite material, such as mutilayers, or multifibers or tubes or any geometry of two or more kinds of materials. The GW can be formed at or near the interface inside a first material such that an evanescent field can probe the second material. The second material may be any state of matter such as a solid, liquid, gas or plasma that will modify the Bragg wavelength resonance for a sensing or control application. The second material may be a microfluidic channel or microreactor or other volume to be proved by the evanescent field of the GW. Alternatively, this invention anticipates the formation of a GW near the surface of a substrate such that the evanescent field of the GW probes the ambient (liquid, gas, air, solid, composite, plasma) in contact with the surface.

In yet another example, the GW be placed to probe multi-component structures and composite materials such as multilayer or multifiber structures, tubes, or any geometry of two or more types of materials. The material being probed can be in any form including but not limited to solid, liquid, gas, and plasma, or multilayer or composite structures with multi-phases (i.e. liquid-gas, liquid solid, superheated materials, nanoparticles, protein, cells, tissue, periodic solid structures filled with gas or liquid). The GW devices can be formed near or at the material interface and sense the material properties according to the evanescent field of the GW mode that extends into the second medium.

Figure 34:
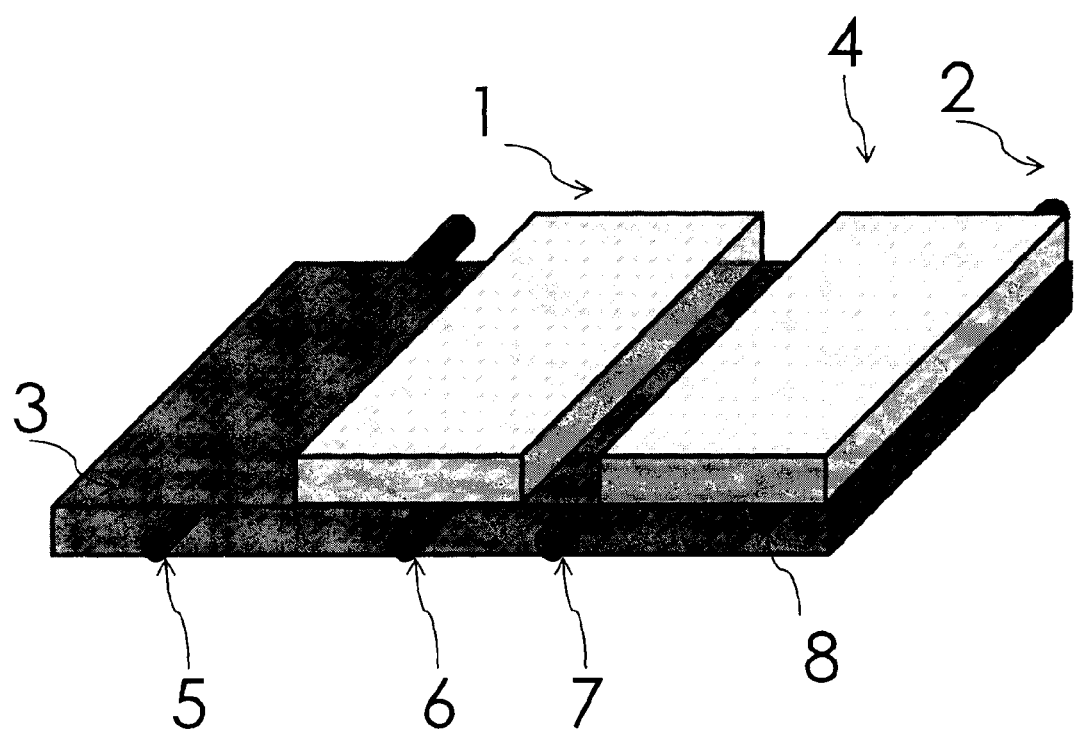
FIG. 34 illustrates a GW formed near the surface of a first material such as glass such that the evanescent field probes into a second material beyond the interface.

FIG. 34 illustrates a device that comprises of three materials (1, 2, and 3) as well as a gas or liquid or other material surrounding all the structures. Material 1 and 2 are second materials bonded to a first material by a convenient method. An open channel is defined by a gap (4) between the two ribs (material 1 and 2). Here, media 1 and 2 may be the same material. Further, the channel may be sealed with another material (not shown) bonded to the tops of material 1 and 2 in FIG. 34. GW devices (5, 6, and 7) are laser fabricated inside a first material (3) at various depths from the top surface or a GW device (8) is formed at the interface of the first medium (3) and a second medium (2). GW devices 5, 6, and 7 are preferentially close to the upper surface of material 3 so that the evanescent field of the guided light extends into the second material for probing.

In the case of GW device 6, the second material (1) is optically probed which could be used to test for changes in the conductivity, stress, strain, temperature, chemical composition, material composition, or any other chemical or physical change taking place therein (1), or in combination with changes to a mechanical system comprising of the first material (3) and second material (1), and other possible structures. Such environmental or material changes will manifest in a tuning of the Bragg resonant wavelength defined by the GW device (5).

Similarly, GW device 5 is probing a second material that may be ambient air, gas, liquid, plasma, vacuum, or composite materials or other combination located immediately above the surface of the first medium (3) to also optically detect changes in material properties in the second medium or combination of first (3) and second material structures through a wavelength shift in the Bragg grating resonance in GW device 5.

Similarly, GW device 8 is probing a second material (2) that may be solid, ambient air, liquid, plasma, vacuum, or composite materials or other combination located immediately above the surface of the first medium (3) to also optically detect changes in material properties in the second medium (2) or combination of first (3) and second (2) material structures through wavelength shifts in the Bragg grating resonance in GW device 5. In this case the BGW device is laser formed to intersect the interface of the first (3) and second (2) media where preferentially medium 2 is an optically transparent and solid material. The relative height of the BW device 8 with respect to the interface can be adjusted according to the measurement needs to increase or decrease the GW sensitivity.

Similarly, GW device 7 is probing a second material that may be ambient air, gas, liquid, plasma, vacuum, or composite material or other combination located immediately above the surface of the first medium (3) to also optically detect changes in material properties in the second medium or combination of first (3) and second material structures through wavelength shifts in the Bragg grating resonance in GW device 7. The second material is confined by walls (materials 1 and 2) to define a channel, or cavity, or microreactor or other type of open volume in which a detected species or analyte can be preferentially delivered through some means of flow (electrophoresis, mechanical pump, gravity, etc.). The cavity may be open as shown in FIG. 34, or sealed with a top layer (not shown).

Further, material 1 and 2 can be either transparent or opaque, and be any solid material such as metal, semiconductor, dielectric, ceramic, and alloys. Other structures and materials may be added to improve the sensitivity or to trap analytes in the evanescent fields near the BW devices The present GW devices according to Examples 5 and 6 provide good sensitivity for temperature and strain measurements that is comparable with fiber Bragg gratings, but with the greatly improved flexibility of applications in bulk optic materials facility by laser writing in three dimensions. Like fiber Bragg grating sensors, the present GW devices are also anticipated to be sensitive to other phenomena such as electric field, magnetic field, conductivity, absorption, pressure, humidity, chemical reactions, and gravity.

It will be appreciated by those skilled in the art that other variations of the preferred embodiment may also be practised without departing from the scope of the invention.

What is claimed is:

1. A method of fabricating an optical device comprising a one-step fabrication and integration involving:
    a beam delivered by a beam delivery source scanning a modulated energy source in a substrate to write a single voxel within one modulation cycle, and
    a plurality of voxels being generated that define a grating and waveguide structure and spacing of said plurality of voxels being defined by speed of the energy beam scanning relative to frequency of the modulated energy source, whereby the spacing of said plurality of voxels is controlled, and each of said plurality of voxels is written by a plurality of pulses, each of said plurality of pulses being a single pulse exposure, and said plurality of pulses having a repetition rate between 10 GHz and 1 Hz frequencies.

2. The method of claim 1 further characterised in that:
each voxel is discrete;
each single pulse exposure being divisible into more than one divided pulses;
the plurality of pulses forming each voxel control optical parameters that include one or more of the following: voxel-to-voxel overlap; physical size; physical shape; and strength of refractive index change;
the plurality of pulses control AC and DC components of the grating and waveguide structure, including at least effective refractive index, and thereby accurately tune grating spectral features in shape, strength, polarization dependence, radiation loss, and dispersion; and
over the plurality of pulses refractive index changes are built-up.

3. The method of claim 1 further characterised in that the structure is periodic or modified periodic.

4. The method of claim 1 further characterised in that the energy source is modulated according to power, beam diameter, scan speed, polarization, transverse scan speed, focusing depth, pulse duration or wavelength.

5. The method of claim 1 further characterised in that the energy source is modulated using an acousto-optic modulator.

6. The method of claim 1 further characterised in that the energy source is modulated using an acousto-optic modulator means, an attenuator means, an OD filter means or a shutter means.

7. The method of claim 1 further characterised in that the energy source is pulsed or continuous.

8. The method of claim 1 further characterised in that the energy source is a laser, an e-beam source, an ion-source or an X-ray source.

9. The method of claim 1 further characterised in that the substrate is glass, crystal, semiconductor material or polymer.

10. The method of claim 1 further characterised in that the substrate is a composite of at least first and second materials forming a multilayer, a multifiber, or multiple tubes, wherein the grating and waveguide structure is formed inside the first material such that an evanescent field probes the second material.

11. The method of claim 10 characterised in that the second material is a microfluidic channel or microreactor.

12. The method of claim 1 further characterised in that the method is used to fabricate a mode converter, a directional coupler, a distributed Bragg reflector, a chirped Bragg grating, an apodized Bragg grating, an add-drop filter, a sensor, a ring resonator or a laser reflector.

13. A system for fabricating an optical device comprising:
(a) an energy source;
(b) a modulating means for modulating the energy source; and
(c) a beam delivery means for applying the energy source to a substrate to scan the substrate to write in a one-step fabrication and integration, a single voxel within one modulation cycle, and a plurality of voxels that define a grating and waveguide structure, and spacing of said plurality of voxels being defined by speed of the beam scanning relative to modulation frequency of the energy source, whereby the spacing of said plurality of voxels is controlled, and each of said plurality of voxels is written by a plurality of pulses, each of said plurality of pulses being a single pulse exposure, and said plurality of pulses having a repetition rate between 10 GHz and 1 Hz frequencies.

14. The system of claim 13 further characterised in that the modulating means is an acousto-optic modulator.

15. The system of claim 13 further characterised in that the modulating means is an attenuator means, an OD filter means or a shutter means.

16. The system of claim 13 further characterised in that the energy source is a laser, an e-beam source, an ion-source or an X-ray source.

17. The system of claim 13 further characterised in that the substrate is glass, crystal, semiconductor material or polymer.

18. The system of claim 13 further characterised in that the system is used to fabricate a mode converter, a directional coupler, a distributed Bragg reflector, a chirped Bragg grating, an apodized Bragg grating, an add-drop filter, a sensor, a ring resonator or a laser reflector.

* * * * *